US012133236B2

(12) United States Patent
Li et al.

(10) Patent No.: US 12,133,236 B2
(45) Date of Patent: *Oct. 29, 2024

(54) COMMUNICATIONS MANAGEMENT USING DOWN LINK CONTROL INFORMATION

(71) Applicant: IPLA HOLDINGS INC., New York, NY (US)

(72) Inventors: Qing Li, Princeton Junction, NJ (US);
Guodong Zhang, Woodbury, NY (US);
Yifan Li, Conshohocken, PA (US);
Allan Y. Tsai, Boonton, NJ (US);
Lakshmi R. Iyer, King of Prussia, PA (US)

(73) Assignee: IPLA HOLDINGS INC., New York, NY (US)

( * ) Notice: Subject to any disclaimer, the term of this patent is extended or adjusted under 35 U.S.C. 154(b) by 277 days.

This patent is subject to a terminal disclaimer.

(21) Appl. No.: 17/832,686

(22) Filed: Jun. 6, 2022

(65) Prior Publication Data
US 2022/0312395 A1    Sep. 29, 2022

Related U.S. Application Data

(63) Continuation of application No. 16/645,001, filed as application No. PCT/US2018/049973 on Sep. 7, 2018, now Pat. No. 11,399,365.
(Continued)

(51) Int. Cl.
*H04W 72/23* (2023.01)
(52) U.S. Cl.
CPC .................................. *H04W 72/23* (2023.01)
(58) Field of Classification Search
CPC ..................................................... H04W 72/23
See application file for complete search history.

(56) References Cited

U.S. PATENT DOCUMENTS 9,019,823 B1    4/2015  Raparthy et al.
2014/0307622 A1  10/2014  Horn et al.
(Continued)

FOREIGN PATENT DOCUMENTS

WO    2011/082822 A1    7/2011

OTHER PUBLICATIONS

3GPP TS 36.212 V14.3.0, "3rd Generation Partnership Project; Technical Specification group Radio Access network; Evolved Universal Terrestrial Radio Access (E-UTRA); Multiplexing and Channel Coding (Release 14)", Jun. 2017 198 pages.
(Continued)

*Primary Examiner* — Ronald B Abelson
(74) *Attorney, Agent, or Firm* — XSENSUS LLP

(57) ABSTRACT

Downlink Control Information (DCI) may be expanded, or enhanced, to allow nodes such as UEs, eNBs, NR-nodes, gNBs, and TRPs in M2M, IoT, WoT networks to coordinate activities on PHY, MAC, and RRC layers. For example, DCI fields may be added or enhanced to include, for example, information regarding time resource allocation, frequency resource allocation, mini-slot allocation, and or Code Block Group (CBG) transmission. Such information, or similar information, may be used in operations such as mini-slot operations, Code Block Group (CBG) transmission, group common Physical Downlink Control Channel (PDCCH), grant-free and grant-less operations, response to Beam Failure Recovery Request (BFRR), UL Transmit (TX) beam change, Quasi-Co-Location (QCL) operations, aperiodic CSI-RS transmission and interference measurement, Band Width Part (BWP) operations, and Multi-Transmission and Reception Point (TRP)/Multi-Panel.

12 Claims, 6 Drawing Sheets

Related U.S. Application Data

(60) Provisional application No. 62/556,070, filed on Sep. 8, 2017.

(56) References Cited

U.S. PATENT DOCUMENTS

| | | |
|---|---|---|
| 2015/0162966 A1 | 6/2015 | Kim et al. |
| 2015/0208386 A1 | 7/2015 | Yang et al. |
| 2017/0135134 A1 | 5/2017 | Rune et al. |
| 2017/0367046 A1 | 12/2017 | Papasakellariou |
| 2017/0373731 A1 | 12/2017 | Guo et al. |
| 2018/0034610 A1* | 2/2018 | He .................. H04L 5/0048 |
| 2018/0124796 A1 | 5/2018 | Noh et al. |
| 2018/0278387 A1 | 9/2018 | Qi |
| 2018/0279274 A1 | 9/2018 | Sun et al. |
| 2018/0302191 A1 | 10/2018 | Park et al. |
| 2018/0310333 A1 | 10/2018 | Akkarakaran et al. |
| 2019/0014598 A1 | 1/2019 | Yoshimura et al. |
| 2019/0045571 A1 | 2/2019 | Wu |
| 2019/0059112 A1 | 2/2019 | Ou et al. |
| 2019/0208505 A1 | 7/2019 | Park et al. |
| 2019/0349904 A1 | 11/2019 | Kwak et al. |

OTHER PUBLICATIONS

3GPP TS 36.213 V14.3.0 "3rd Generation Partnership Project; Technical Specification Group Radio Access Network; Evolved Universal Terrestrial Radio Access (E-UTRA); Physical Layer Procedures (Release 14)", Jun. 2017, 460 pages.

3GPP TSG RAN Wg1 #89 R1-1708047, Samsung, "Early Termination of Polar Decoding", May 2017, 9 pages.

3GPP TSG RAN WG1 Meeting #88bis R1-1705069, Huawei, HiSilicon, "Resource Allocation and Indication for Data Channel", Apr. 2017, 8 pages.

U.S. Appl. No. 62/472,088, Specification, Mar. 16, 2017 (Year: 2017).

U.S. Appl. No. 62/541,796, Drawings-other_than_black_and_white_line_drawings, Aug. 7, 2017 (Year: 2017).

U.S. Appl. No. 62/547,373, Specification, Aug. 18, 2017 (Year: 2017).

AT&T: "Single and Multi DCI NC-JT Framework for Multi TRP Transmission in NR", 3GPP Draft; R1-1702259, Feb. 12, 2017.

Interdigital Inc: "DCI Design for Multi-TRP/Panel Transmission for DL", 3GPP Draft; R1-1714138, XP051316927.

NTT Docomo: "Discussion on Codeword Mapping", 3GPP Draft; R1-1705715, Apr. 2017.

* cited by examiner

COMMUNICATIONS MANAGEMENT USING DOWN LINK CONTROL INFORMATION

CROSS-REFERENCE TO RELATED APPLICATIONS

This application is a continuation of U.S. application Ser. No. 16/645,001, filed Mar. 6, 2020, which is the National Stage Application of International Patent Application no. PCT/US2018/049973 filed Sep. 7, 2018, which claims the benefit of U.S. Provisional Application No. 62/556,070, filed on Sep. 8, 2017, entitled "Communications management using down link control information," the content of which is hereby incorporated by reference in its entirety.

BACKGROUND

In LTE, Downlink Control Information (DCI) is formed, and transmitted in a Physical Downlink Control Channel (PDCCH) or an Enhanced Downlink Control Channel (EPDCCH), to signal to the UE how to receive its data on a Physical Downlink Shared Channel (PDSCH) or transmit its data on a Physical Uplink Shared Channel (PUSCH) in a subframe. See, for example, 3GPP TS 36.212, Multiplexing and channel coding (Release 14), V14.3.0. An LTE DCI may transport downlink, uplink or sidelink scheduling information, requests for aperiodic Channel Quality Indicator (CQI) reports, Licensed-Assisted Access (LAA) common information, and notifications of Multicast Control Channel (MCCH) change or uplink power control commands for one cell and one Radio Network Temporary Identifier (RNTI) for a User Equipment (UE), for example. The RNTI is implicitly encoded in the Cyclic Redundancy Check (CRC), so that only the UE with the RNTI may decode the DCI format, and hence use the corresponding PDSCH. The packed DCI information is the payload to the PDCCH encoding chain. The DCI formats are further classified as downlink DCI formats and uplink DCI formats as detailed in 3GPP TS 36.212.

SUMMARY

Downlink Control Information (DCI) may be expanded, or enhanced, to allow nodes such as UEs, eNBs, NR-nodes, gNBs, and TRPs in 3GPP networks to coordinate activities on PHY (physical layer), MAC (medium access control layer), and RRC (radio resource control layer). For example, DCI fields may be added or enhanced to include information regarding time resource allocation, frequency resource allocation, mini-slot allocation, and/or Code Block Group (CBG) transmission. Such information, or similar information, may be used in operations such as mini-slot operations, Code Block Group (CBG) transmission, group common Physical Downlink Control Channel (PDCCH), grant-free or grant-less operations, response to Beam Failure Recovery Request (BFRR), UL Transmit (TX) beam change, Quasi-Co-Location (QCL) operations, aperiodic CSI-RS transmission and interference measurement, Band Width Part (BWP) operations, and Multi-Transmission and Reception Point (TRP)/Multi-Panel.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE FIGURES

A more detailed understanding may be had from the following description, given by way of example in conjunction with accompanying figures.

DETAILED DESCRIPTION

Figure 1A:
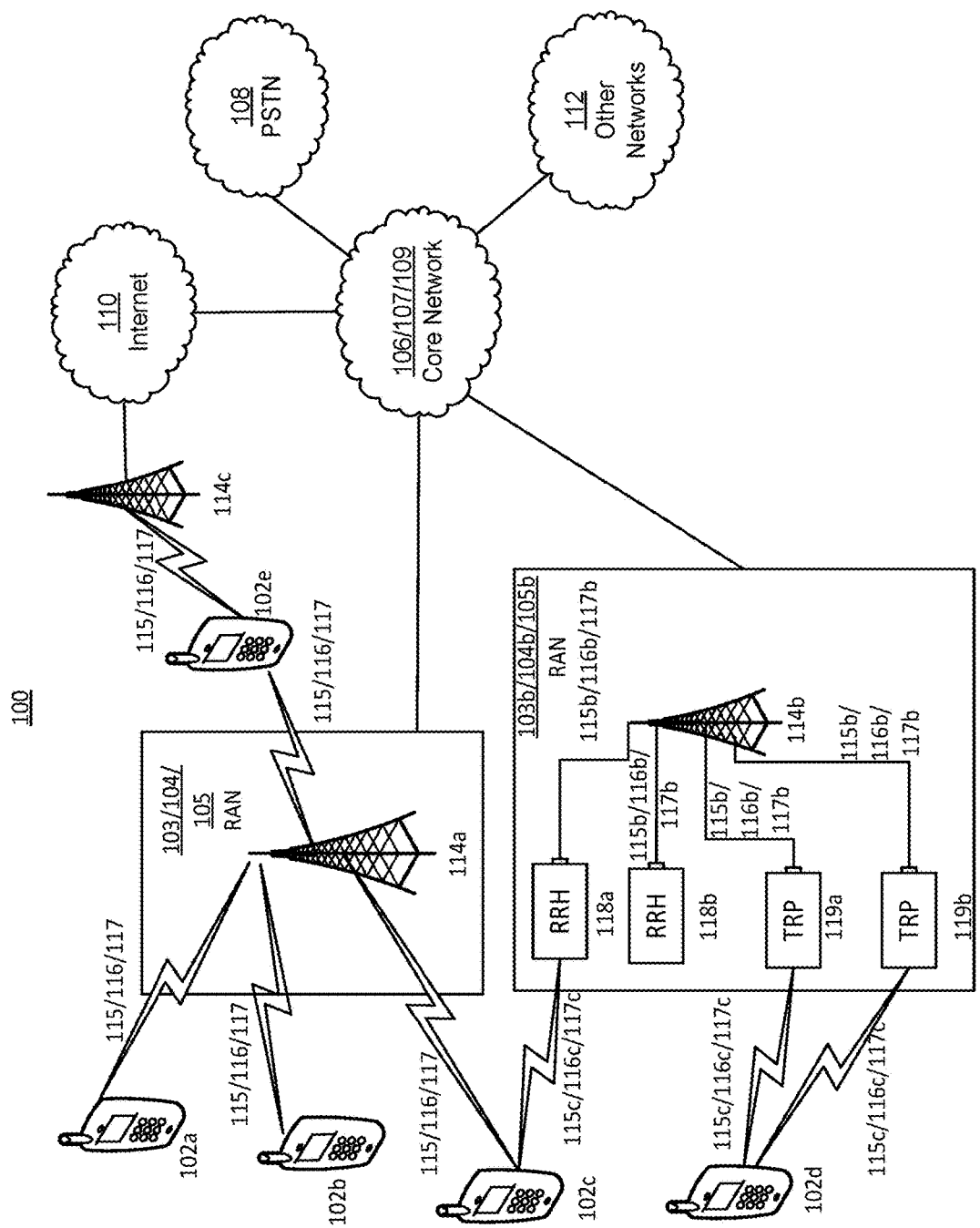
FIG. 1A illustrates an example communications system.

Table 1 of the Appendix lists many of the acronyms used herein.

A number of challenges are presented by New Radio (NR) architectures. A first problem is that, as more new functions have been introduced into NR system, more physical layer signaling is required for the access network to direct a UE to receive and transmit its data efficiently. How to categorize the control information required for new radio, and how to optimize the DCI design for a NR system, are fundamental problems for control signaling design.

A second challenge is that beamforming may be used in NR to provide enough cell coverage and high throughput. Due to the directional nature of beamforming, beam failure may happen more frequently than, for example, radio link failure in LTE. To enable quick and efficient beam failure recovery, Layer 1 signaling-based beam failure recovery mechanisms may be used in NR. A UE may transmit its beam failure recovery request on PUCCH or PRACH, and the gNB may send its response to its beam failure recovery request on a PDCCH to the UE, for example.

A third challenge is how to reduce signaling and reporting overhead for massive MIMO design. For example, how to make the best use of a Quasi-Co-Location (QCL) property, and how to optimize the Channel-State Information-Reference Signal (CSI-RS) functions, are important questions.

A fourth challenge is how to design DCI in NR to dynamically configure the Band Width Part (BWP) needs to be addressed for wide band operations in a NR system. In addition, how to use QCL property to optimize multi-TRP and multi-panel design needs to be solve for a NR system.

To address these and other challenges, DCI fields may be added or enhanced to support, for example, time resource allocation, frequency resource allocation, mini-slot allocation, or Code Block Group (CBG) transmission. Such information, or similar information, may be used in operations such as mini-slot, group Common PDCCH, grant-free communications, Response to Beam Failure Recovery Request (BFRR), UL Transmit (TX) beam change, Quasi-Co-Location (QCL), aperiodic CSI-RS transmission and interference measurement, Band Width Part (BWP), or Multi-Transmission and Reception Point (TRP)/Multi-Panel.

New or enhanced DCI formats may be used in various RAN architectures, where they are used in processes implemented by, for example, an NR-node or gNB, Transmission and Reception Point (TRP), or Remote Radio Head (RRH), as well as the central controller in RAN or control function in a RAN slice. Such formats and operations may be used equally in grant-free or grant-less operations, for example.

Parameters may be used for Time Resource Allocation (TRA). TRA may be contiguous or noncontiguous. Noncontiguous TRA may be evenly distributed (herein termed "periodic") or unevenly distributed (herein termed "distributed").

Time resource may be allocated dynamically with DCI per slot/subframe for slot/subframe based scheduling, or multi-slot/multi-subframe for slot/subframe aggregated scheduling. For slot/subframe aggregated time resource allocation, more than one set of allocation may be included if each allocation of aggregated slot/subframes is different, for example time resource allocation set 0, for example TRA0, is for slot 0/subframe 0, and time resource allocation set 1, for example TRA1, is for slot 1/subframe 1, etc. Note, either slot or subframe based may be indicated in the System Information (SI) or configured by RRC signaling.

For multi-link scenarios, such as multi-BWP, multi-TRP, multi-carrier, or multi-RAT connections, etc., the time resources may be allocated jointly with DCI(s) on one NR-PDCCH, for example, a joint CORESET (Control Resource Set), or separately with DCIs on more than one NR-PDCCH, for example, different CORESETs respectively. If allocated jointly by one NR-PDCCH, more than one set of allocation may be used if each allocation of multi-BWP, multi-TRP, multi-carrier, or multi-RAT connections is different, for example time resource allocation set 0, for example TRA0, is for BWP 0/TRP 0/Carrier 0/RAT 0, and time resource allocation set 1, for example TRA1, is for BWP 1/TRP 1/Carrier 1/RAT 1, etc.

An example of time resource allocation is described in Table 2 of the Appendix, which may be indicated by DCI field(s) explicitly or indicated by DCI field(s) implicitly, e.g., using the bitmap or index of the time allocation from a set or multiple sets of time allocations.

A set or subset of the TRA parameters exemplified in Table 2 may be added into the current LTE DCI format 0/1/1A/1B/1C/1D/2/2A/2B/2C for time resource allocation feature. However, a set or subset of the TRA parameters exemplified in Table 2 may be also used to form a new DCI format, for example a DCI format for mini-slot allocation within a slot or subframe which is exemplified in Table 4, Table 6 and Table 7 of the Appendix.

A parameter or parameters may be used for Frequency Resource Allocation (FRA). FRA may be contiguous or noncontiguous. For noncontiguous, it may be evenly distributed with the same size of segments and a gap between the segments, or unevenly distributed with different sizes of segments and different gaps between the segments.

Frequency resource may be allocated dynamically with DCI in the unit of Physical Resource Block (PRB), for example 12 subcarriers, or in the unit of Resource Block Group (RBG) where the RBG is m consecutive PRBs based on the RBG_size=m which may be indicated in the System Information (SI) or configured by RRC signaling.

For multi-link scenarios, such as multi-BWP, multi-TRP, multi-carrier, or multi-RAT connections, etc., the frequency resources may be allocated jointly with DCI(s) on one NR-PDCCH (for example, a joint CORESET) or separately with DCIs on more than one PDCCH (for example, on different CORESETs respectively). Either allocated jointly or not by one NR-PDCCH, more than one set of allocation may be used if each allocation of multi-BWP, multi-TRP, multi-carrier, or multi-RAT connections is different, for example frequency resource allocation set 0, for example FRA0, is for BWP 0/TRP 0/Carrier 0/RAT 0, and frequency resource allocation set 1, for example FRA1, is for BWP 1/TRP 1/Carrier 1/RAT 1, etc.

An example of parameters for frequency resource allocation is described in Table 3 of the Appendix, which may be indicated by DCI field(s) explicitly or indicated by DCI field(s) implicitly, e.g., using the bitmap or index of the frequency allocation from a set or multiple sets of frequency allocations.

A subset of the FRA parameters exemplified in Table 3 may be added into the current LTE DCI format 0/1/1A/1B/1C/1D/2/2A/2B/2C for frequency resource allocation, especially for the noncontiguous allocation for CP-OFDM waveform. However, a set or subset of the FRA parameters exemplified in Table 3 may be also used to form a new DCI format, for example a DCI format for activating/deactivating a BWP which is exampled in Table 10B of the Appendix.

A time allocation parameter or parameters may be used for mini-slot allocation in time. A 1~7 symbol mini-slot may be inserted at each symbol of a slot. The mini-slot allocation may be signaled by a DCI. An example is shown in Table 4 of the Appendix.

A subset of the FRA parameters exemplified in Table 3 may be added into the current LTE DCI format 0/1/1A/1B/1C/1D/2/2A/2B/2C for mini-slot allocation in frequency. However, a set or subset of the mini-slot allocation parameters exemplified in Table 2 and Table 4 may be also used to form a new DCI format, for example a DCI format for mini-slot which is exemplified in Table 6 for an uplink mini-slot and Table 7 for a downlink mini-slot in the Appendix.

A DCI field may be used for CBG transmission with the parameters as exemplified in Table 5 of the Appendix.

A subset of the CBG parameters exemplified in Table 5 may be added into the current LTE DCI format 0/1/1A/1B/1C/1D/2/2A/2B/2C for CBG based (re)transmissions. However, a set or subset of the parameters may be also used to form a new DCI format, for example a DCI format for CBG transmission.

DCI formats may be adapted for use with mini-slot(s). A light DCI structure is desired for fitting into the limited symbol resources of a mini-slot if the DCI is allocated within the mini-slot as well as for reduced latency. Examples of DCIs for a mini-slot are shown in Table 6 for an uplink minis-lot and Table 7 for a downlink mini-slot of the Appendix.

A UL or DL mini-slot DCI may be carried by a UE specific NR PDCCH for a UE or by a group common PDCCH for a group of UEs. A compact version of the DCI, exemplified in Table 6 and Table 7, for DL mini-slot may also be inserted into a DL mini-slot (for example, the mini-slot occasion) which is indicated by the mini-slot allocation DCI described in Table 4 or configured by RRC.

A UE blindly decodes the UL or DL mini-slot DCI carried on the NR-PDCCH in a UE specific searching space allocated either at the beginning symbols of a slot or subframe or at UE's mini-slot occasions (for example within a mini-slot), with the UE's C-RNTI or Temp-C-RNTI, or carried on the group common PDCCH for a group of UEs in a group common searching space with the UE's Group Common-RNTI (GC-RNTI).

Once the UE has successfully decoded the DL mini-slot DCI(s), UE may conduct data reception within a mini-slot. Where there is no DCI in the mini-slot, this may involve receiving the DL data and DMRS on PDSCH scheduled at the allocated mini-slot(s) by the decoded DCI(s) allocated at the beginning symbols of a slot or subframe, for example, the mini-slot DCI with C-RNTI, TC-RNTI or GC-RNTI, estimated the channel using the DMRS, and demodulate and decode the received data per the MCS, TPMI/PMI, etc., and then conduct HARQ combining with retransmissions based on the HARQ process number, NDI, RV, etc. for the data information bits. Also, conducts the HARQ Acknowledgment feedback (for example HARQ-ACK) per the HARQ-ACK resource parameter. Where there is one or more DCIs in the mini-slot(s) with C-RNTI or TC-RNTI, this may involve detecting the DCI at the allocated mini-slot(s) to check if there is any DL data scheduled in that mini-slot. If there is a DL data scheduled at this mini-slot, then the UE conducts channel estimation, demodulation, decoding, and HARQ combining for retransmissions, etc. for the data information bits, as well as the HARQ-ACK feedback.

Once the UE has successfully decoded the DL mini-slot DCI(s) carried on NR-PDCCH or GC-PDCCH allocated either at the beginning symbols of a slot or subframe or PDCCH at UE's mini-slot occasions (for example within a mini-slot), UE may additionally or alternatively conduct measurements within the mini-slots. Where there is no DCI in the mini-slot, the UE may conduct the measurement procedure using the Reference Signal in the mini-slot indicated by the DCI, carried by the NR-PDCCH or GC-PDCCH at the beginning symbols of a slot or subframe, of the measurement reference signal resource configurations by RRC. For example, the reference signals such as CSI-RS based beam training, mobility measurement, time or frequency tracking and correction, or Channel State Information (CSI) measurement, etc. Where there is DCI in the mini-slot, the UE may detect the DCI at the allocated mini-slot(s) to check if there is any DL RS configured in that mini-slot for measurement. If there is a DL RS configured at this mini-slot, then the UE conducts measurements with the RS per the configuration in the DCI detected in the mini-slot.

Regarding multiple DCI contents, if the DCI content in a mini-slot conflicts with the mini-slot DCI carried by NR-PDCCH or GC-PDCCH at the beginning symbols of a slot or subframe or RRC configuration, the DCI in the mini-slot may override the DCI on NR-PDCCH or GC-PDCCH or RRC configuration. For multiple mini-slots, the DCI in each mini-slot takes the highest priority. For a mini-slot without DCI inserted (for example, an aggregated mini-slot transmission over more than one mini-slot), the previous mini-slot's DCI, if presented in time after the NR-PDCCH or GC-PDCCH at the beginning symbols of a slot or subframe, may be applied, otherwise the DCI of NR-PDCCH or GC-PDCCH may be applied.

A new DCI format may be designed for use with a group common PDCCH, where the group common PDCCH is used for signaling the slot format to a group of UEs. An example is shown in the Table 8A of the Appendix.

In Table 8B an example is provided for slot format indication of up to $2^i$ slots.

A group common PDCCH may indicate preemption to eMBB UEs.

Table 8C provides an example of the configuration of such a DCI wherein the starting resources and number of resources (symbols in time and RBs in frequency) from the start are configured in the DCI.

Table 8D provides an example of the configuration of such a DCI wherein the starting resources (symbols in time and RBs in frequency) are configured in the DCI by x and y are configured through RRC.

Table 8E provides an example of the configuration of such a DCI wherein the starting symbols in time and k sets of contiguous RBs of granularity y in frequency are configured in the DCI. The k sets of RBs may be contiguous or discontinuous in frequency. Here x and y are configured through RRC.

A UE may be configured or assigned with one or more Group Common RNTIs (GC-RNTIs), for example a value of $(0000)_{16} \sim (FFFC)_{16}$, that may be carried in the group common PDCCH. For example, the scrambling code in the DCI may be initialized or its CRC is scrambled with the GC-RNTI of that DCI. When a UE uses its GC-RNTI to scramble the DCI, it may correctly decode its Group Common-PDCCH (GC-PDCCH).

A GC-PDCCH carrying the SFI may be transmitted both in a common CORESET configured by the PBCH and/or in a UE-specific CORESET. When a UE is at RRC Idle or RRC Inactive state, it may blind decode the common CORESET configured by the PBCH, for example in the common searching space, for SFI information. When a UE is at RRC Connected state, it may monitor the GC-PDCCH on the UE-specific CORESET, for example in the UE specific searching space, if it is configured or in the common CORESET in the common searching space.

Multiple GC-PDCCHs may be sent in the same monitoring occasion of a UE. The different GC-PDCCHs may have the same GC-RNTI or different GC-RNTIs. For example, the gNB may send 2 GC-PDCCHs in one or two CORESETs with the same or different GC-RNTI for different purposes—one for indicating the SFI and another for indicating preemption.

If a UE receives multiple GC-PDCCHs either in the same or different monitoring occasions and the GC-PDCCHs contain conflict content, the UE may prioritize one over another.

For example, a GC-PDCCH in slot N may indicate a SFI applicable to the remaining R slots in a radio frame. Then it may receive another GC-PDCCH in slot N+1 indicating a different SFI applicable to the remaining R−1 slots in the frame—in this case the UE may prioritize the most recent GC-PDCCH.

Another example is that a UE detects one GC-PDCCH in the common searching space and one GC-PDCCH in the UE specific searching space, then the UE may choose the GC-PDCCH detected from the UE specific searching space if the detected GC-PDCCHs contain conflict content.

Another example is that when a UE operates with two TRPs and receives one GC-PDCCH from each TRP in the same searching space with conflict content, the UE may prioritize in a number of ways. For example, if one of the TRPs is from the primary cell and the other from secondary cell, the UE follows the GC-PDCCH from the primary cell. If one of the TRPs (or its beam) is designated as the primary beam, the UE follows the GC-PDCCH from the primary TRP beam. If UE has a grant from one of the TRPs, it prioritizes the GC-PDCCH from that TRP.

If the UE fails to detect a GC-PDCCH, it uses the default configuration. For example, if it does not receive or failed to decode the SFI from a GC-PDCCH, it may use a default configuration indicated through system information.

DCI formats may be designed for use in grant-free resource allocation. An example is shown in Table 9 of the Appendix.

A DCI may be designed for HARQ/ACK feedback for grant-free communications as an example. An example is shown in Table 10A of the Appendix.

Grant-free DCIs may be carried by a UE specific NR-PDCCH allocated at the beginning symbols of a slot or subframe or allocated at mini-slot occasions configured for grant-free transmissions for a UE or by a group common PDCCH for a group of UEs. A UE blindly detects the Grant-free DCIs carried on an NR-PDCCH in a UE specific searching space with the UE's C-RNTI or Grant-Free-RNTI (GF-RNTI) assigned by the gNB during the Attachment procedure at Initial Access stage or RRC Connect procedure when switching from RRC-Idle or RRC-Inactive to RRC-Connect state. A UE may also blindly detect the Grant-free DCI(s) carried on a group common PDCCH for a group of UEs in a group common searching space with the UE's Group Common-RNTI (GC-RNTI) or Grant-Free-RNTI (GF-RNTI) assigned by the gNB during the Attachment procedure at Initial Access stage or RRC Connect procedure when switching from RRC-Idle or RRC-Inactive to RRC-Connect state.

Once the UE successfully decoded the grant-free DCIs, UE is ready to conduct the UL grant-free data transmission per the resource allocation, MCS, etc. indicated the DCI Format 0D in Table 9 with the Layer 1 activation DCI in Table 10B of the Appendix, where the transmission may be slot or subframe based or mini-slot based.

For initial transmission, a UE may set the initial transmit power based on the path loss measurement using the Synchronization Signal (SS) or CSI-RS on DL or DMRS in the NR-PDCCH or GC-PDCCH carrying the grant-free DCI(s). UE may also set the initial transmission power based on the Group based UL power setting carried on the DCI Format 3/3A as an example, or RRC signaling for power setting from gNB.

For retransmission, the UE may set the transmit power based on path loss based open loop power control, or based on the feedback from the gNB in the TCP command for PUSCH in the DCI Format 0D in Table 9.

The UE may set the Timing Advance for UL time adjustment during the Attachment procedure at Initial Access stage or RRC Connect procedure when switching from RRC-Idle or RRC-Inactive to RRC-Connect state. The UE may also make finer timing adjustment based on the DL received Synchronization Signals or time or frequency tracking Reference Signal or the DMRS on the NR-PDCCH carrying the grant-free DCIs.

When there is a UL data passed from UE' higher layer, the UE encode and modulates the data per the MCS etc. in the DCI Format 0D in Table 9, and then transmits it on the resources as indicated by the time and frequency resource allocation in the DCI Format 0D in Table 9 with the initial transmit power. If repetition is enabled, the UE may repeatedly send the same data at different time allocations as configured and at the same or different PRB/RBG resources allocated with or without frequency hopping using the same or different MCS and RV setting per the configuration in DCI Format 0D, till reaches the maximum repetition number K or is timed out by higher layer timer (such as MAC layer timer), or receives a first ACK on the DCI carrying the HARQ-ACK feedback from gNB. The UE may also adjust the transmit power with a configured incremental value for repetitions, if it's below the UE's maximum allowable transmit power level.

If a NACK is received on the DCI carrying the HARQ-ACK feedback exemplified in Table 10A, the UE may send the same Transport Block (TB) data from the higher layer at different time allocations as configured and at the same or different PRB/RBG resources allocated with or without frequency hopping using the same or different MCS and RV setting per the configuration in DCI Format 0D in Table 9 or grant based configuration for UL transmission, till reaches the maximum retransmission number or is timed out by higher layer timer (such as MAC layer timer), or receives a first ACK on the DCI carrying the HARQ/ACK feedback from gNB. The UE may adjust the power level per path loss for open loop power control or TCP command piggybacked on the HARQ-ACK feedback for closed loop power control. The UE may also adjust the Timing Advancement for UL per the TA piggybacked on the HARQ-ACK feedback.

The UE may also be indicated to transmit UL Control Information (UCI) on PUCCH and/or Sound Reference Signal (SRS) without the PUSCH (for example data) using the similar procedures as the above.

HARQ-ACK feedback may be used. After each UL transmission, the UE may detect the grant-free DCI for HARQ-Ack feedback carried by either: a UE specific NR-PDCCH for a UE in UE specific searching space using the UE's C-RNTI or GF-RNTI which may be allocated at the beginning symbols of a slot or subframe or allocated at mini-slot occasions configured for grant-free transmissions; a group common PDCCH for a group of UEs in group common searching space using GF-RNTI or GC-RNTI; or a common searching space indicated by broadcasting channel such as PBCH using Temp-C-RNTI, C-RNTI or GF-RNTI. The HARQ ID derived from the time, frequency and/or UE ID may also be used for scrambling the HARQ-ACK DCI if the UE derives it and piggy-backs it on its UL grant-free transmission.

For multiple DCI contents, if a common or UE specific DCI content carried in a NR-PDCCH or GC-PDCCH conflicts with the GF-DCI, the DCI(s) in the GF-DCI override the DCI on NR-PDCCH or GC-PDCCH. If multiple GF DCIs are activated, the latest one takes the highest priority. If the GF-DCI(s) are deactivated, then a UE may only conduct grant-free UL transmission fully configured per the RRC signaling. If the UE detects a response from the gNB with GF-DCI(s) activated following its initial RRC configured grant-free transmission, then it may use the configuration activated by the received GF-DCI(s) for repetition, retransmission or for following new data transmission(s).

DCI formats may be adapted to support beam failure recovery. For example, DCI formats may be adapted to support a gNB's response to a Beam Failure Recovery Request (BFRR), a gNB initiated UL TX Beam change, and for corresponding UE behaviors.

A new DCI format, such as format 7A described herein, may be used to signal the gNB's response to beam failure recovery request.

DCI for a response to a beam failure recovery request may include a D L TX beam confirmation. For example, where a UE reports only one candidate new beam, one bit may be used to indicate whether the new candidate beam reported in UE's BFRR may be used as gNB's TX beam or not. See Table 10C of the Appendix.

Where a UE reports multiple candidate new beams, then N bits may be used to indicate whether one of new candidate beams (up to $2^i$) reported in UE's BFRR may be used as gNB's TX beam or not. An example of N=2 is shown in Table 10D of the Appendix.

DCI for a response to a beam failure recovery request may include a field for beam reporting in UL. For example, such a field may be used if a DL beam confirmation bit field indicates that none of new candidate beams reported in UE's latest BFRR may be used or there are no new candidate beams reported in UE's latest BFRR.

DCI for a response to a beam failure recovery request may include a field for CSI-RS allocation in the DL. This may include an indication of one CSI-RS resources pattern out of the M CSI-RS configurations signaled by RRC signaling, and additionally or alternatively include a timing offset and repetition of the DL CSI-RS transmission.

DCI for a response to a beam failure recovery request may include a field for UL resources of PUCCH for beam reporting. This may include an indication of PUCCH resources of the format used for beam reporting. For example, if Q potential PUCCH resources are configured by RRC signaling or specified in the standards. Then, $\lceil \log_2 Q \rceil$ bits may be used for this field.

This may additionally or alternatively include a timing offset of beam reporting on the indicated PUCCH resources: the value of timing offset may be signaled either implicitly or explicitly. For implicit signaling, for example, the timing offset of beam reporting on PUCCH is a fixed value after the last CSI-RS instance indicated in the DCI format 7A. For explicit signaling, for example, K1 kits indicates $2^{K1}$ possible timing offsets.

This may additionally or alternatively include a number of beam reporting DCI for a response to a beam failure recovery request may include UE ID. An example of DCI format 7A is shown in the Table 11 of the Appendix.

After a UE detects a beam failure and transmits a beam failure recovery request (BFRR) to the gNB, the UE may monitor a PDCCH format 7A where gNB's response to BFRR is signaled in the common and UE-specific search spaces within a certain time window. For a valid PDCCH format 7A that is detected, UE may obtain the gNB's response to the latest BFRR it transmitted. The UE may use this information to update the DL TX Beam in the beam pair link (BPL) between the gNB and the UE. Alternatively, the UE may perform beam measurement per DCI format 7A.

The UE may use the information of DL TX beam confirmation to know whether the gNB may use one of the new candidate beams reported in the UE's latest transmitted BFRR. If yes, the UE may use the confirmed DL TX Beam in the BPL between the gNB and the UE.

If no, the UE may perform CSI-RS measurement and beam reporting to help the gNB to determine a new DL TX beam. The UE may obtain the CSI-RS measurement related information to perform CSI-RS measurement as indicated in "CSI-RS allocation" field in the received DCI format 7A. Then, it performs beam reporting per the "UL resources of PUCCH for beam reporting" in the received DCI format 7A. Upon receiving the beam reporting from the UE, the gNB may determine a new DL TX Beam and notify the UE.

A DCI format, such as format 7B described herein, may be used to indicate or carry signaling for a UL TX beam change initiated, for example, by a gNB. For example, the DCI information may carry a UE ID.

DCI information may be used, for example, in various methods may be used to indicate a UL TX beam change. A first way to indicate a UL TX beam change is for one bit to be used to indicate whether a new UE's TX beam should be used, decided by gNB's measurement of UE's uplink DMRS and SRS. A second way is for two bits to be used for UL TX beam change information. The first bit may be used to indicate whether the UL TX beam should be changed. The second bit may indicate either gNB may indicate a new UL TX beam or gNB may send a SRS request for UE to transmit SRS so that gNB may perform measurement and determine a new UL TX beam.

Similarly, a DCI format, such as format 7B, may be used to indicate or carry signaling for a new UL TX beam. For example, a UL new TX beam field may be used where the UL TX beam change indication field indicates a change. The field carries an identification of the new TX beam for the UE in the uplink A DCI format, such as format 7B, may be used to indicate or carry signaling for SRS transmission. For example, an SRS transmission field may be used where the UL TX beam change indication field indicates no change, and include an indication of UL TX beams that the UE should use to transmit SRS. For example, suppose that R sets of SRS configurations are configured by RRC signaling or specified in the standards. If each SRS configuration contains a subset of UL TX beams and SRS patterns, then $\lfloor \log_2 R \rfloor$ bits may be used for an SRS transmission field.

A field may be used to indicate the timing offset of SRS on indicated UL TX beams. This field may contain: the value of timing offset may be signaled either implicitly or explicitly. In implicit signaling, for example, the timing offset may be a fixed value after the received UL TX Beam Change DCI format 7B. For explicit signaling, K5 bits may be used to indicate $2^{K5}$ possible timing offsets.

A field may be used to indicate a number of SRS transmissions. For implicit signaling, for example, a number of SRS on a given UL TX beam equals to a number specified in the standards, for example, one. For explicit signaling, for example, K6 bits may be used to indicate one of $2^{K6}$ possible numbers of SRS transmission.

Note that signaling related to UL TX Beam change may be piggybacked in DCI format 7A or other UL/DL grant DCIs.

An example of DCI format 7B is shown in the Table 12 of the Appendix.

A UE may monitor a PDCCH format 7B periodically or other DCIs such as UL/DL grants with DCI format 7B contents piggybacked in the common and UE-specific search spaces within a certain time window. For a valid PDCCH format 7B or UL/DL grant with DCI format 7B contents piggybacked that is detected, UE may obtain the gNB's initiated UL TX beam change information. The UE may use this information to update the UL TX Beam in the BPL between the gNB and the UE. Or the UE may transmit SRS per DCI format 7B.

The UE may use the information of UL TX beam confirmation to know whether the gNB may indicate a new UL TX beam for the UE. If yes, the UE may use the indicated UL TX Beam in the BPL between the gNB and the UE.

If no, the UE may transmit SRS to help the gNB to determine a new UL TX beam, and the UE may transmit SRS per the SRS transmission related information as indicated in "SRS transmission" field in the received DCI format 7B. It may follow the signaled SRS configuration, timing offset, and number of transmissions. Upon receiving the SRS from the UE, the gNB may determine a new UL TX Beam and notify the UE.

DCI may be adjusted to support QCL indication, QCL checking indication, aperiodic CSI-RS transmission, and aperiodic interference measurement. The following signaling may be carried in DCI by either enhancing existing DCI fields or using new DCI formats: PDSCH quasi-co-location indicators; PDCCH quasi-co-location indicators; quasi-co-location checking indicators; aperiodic CSI-RS triggering indicators; aperiodic CSI-RS resource indicators; and Aperiodic Interference Measurement Resource (IMR) triggering indicators. Examples of the number of bits needed and description of each of these indicators are shown in Table 13 of the Appendix.

A set or subset of the DCI field parameters in Table 13 may be added into the current LTE DCI format 0/1/1A/1B/1C/1D/2/2A/2B/2C for corresponding function. However, a set or subset of the DCI parameters in Table 13 may be also used to form a new DCI format.

PDSCH resource mapping may be used with quasi-colocation of antenna ports. A UE may be configured up to 8 parameter sets containing the QCL information of the DMRS for PDSCH by higher layer signaling to decode PDSCH per a detected PDCCH with DCI(s) intended for the UE.

The UE may use the parameter set list in the DCIs according to the value of the PDSCH Quasi-Co-Location Indicator field (mapping defined in Table 14 of the Appendix for 1 bit field scenario, Table 15 of the Appendix for 2 bits field scenarios, Table 16 of the Appendix for 3 bits filed scenario) in the detected PDCCH with DCIs for determining the QCL relationship of the DMRS for PDSCH with other reference signals.

A UE may be configured with one or two DMRS port group(s) based on the number of PDSCH that is monitored. When a UE is configured with one DMRS port group, if the PDSCH Quasi-Co-Location Indicator field is 1 bit, state '0' is configured; if the PDSCH Quasi-Co-Location Indicator field is 2 bits, one of the state '00', '01' is configured; if the PDSCH Quasi-Co-Location Indicator field is 3 bits, one of the state '000', '001', '010', '011' is configured. Each state refers to one RS set, which indicates a QCL relationship for the DMRS port group.

When a UE is configured with two DMRS port groups, if the PDSCH Quasi-Co-Location Indicator field is 1 bit, state '1' is configured; if the PDSCH Quasi-Co-Location Indicator field is 2 bits, one of the state '10', '11' is configured; if the PDSCH Quasi-Co-Location Indicator field is 3 bits, one of the state '100', '101', '110', '111' is configured. Each state refers to two RS sets where each RS set indicates a QCL relationship for one of the two DMRS port groups of the UE respectively.

With different value of the PDSCH Quasi-Co-Location Indicator field configured, the UE may determine the QCL information for each DMRS port group such as which RS(s) is QCL-ed and the QCL-ed parameters for each RS from the parameters in the corresponding parameter set configured via higher layer signaling. Note, there may be one or more RS(s) with same or different types in a RS set. If there are more than one RS in a RS set, each of them may associated with different QCL parameters.

A set or subset of the DCI PDSCH Quasi-Co-Location Indicator field parameters in Table 14, Table 15 and Table 16 may be added into the current LTE DCI format 0/1/1A/1B/1C/1D/2/2A/2B/2C for indicating QCL for PDSCH DMRS. However, a set or subset of the above DCI parameters may be also used to form a new DCI format, for example a DCI format for indicating QCL for PDSCH DMRS.

For one DMRS port group configured case, one or more of the following parameters for determining PDSCH antenna port quasi co-location are configured via higher layer signaling for each parameter set:

qcl-CSI-RS-ConfigNZPId-NR.
    qcl-CSI-RS-parameter-NR
    qcl-SSblock-Index-NR.
    qcl-SSblock-parameter-NR
    qcl-PTRS-ConfigId-NR.
    qcl-PTRS-parameter-NR
    qcl-TRS-ConfigId-NR.
    qcl-TRS parameter-NR For two DMRS port groups configured case, one or more of the following parameters for determining PDSCH antenna port quasi co-location are configured via higher layer signaling for each parameter set:

qcl-DMRSgroup1-CSI-RS-ConfigNZPId-NR.
    qcl-DMRSgroup2-CSI-RS-ConfigNZPId-NR.
    qcl-DMRSgroup1-CSI-RS-parameter-NR
    qcl-DMRSgroup2-CSI-RS-parameter-NR
    qcl-DMRSgroup1-SSblock-Index-NR.
    qcl-DMRSgroup2-SSblock-Index-NR.
    qcl-DMRSgroup1-SSblock-parameter-NR
    qcl-DMRSgroup2-SSblock-parameter-NR
    qcl-DMRSgroup1-PTRS-ConfigId-NR.
    qcl-DMRSgroup2-PTRS-ConfigId-NR.
    qcl-DMRSgroup1-PTRS-parameter-NR
    qcl-DMRSgroup2-PTRS-parameter-NR
    qcl-DMRSgroup1-TRS-ConfigId-NR.
    qcl-DMRSgroup2-TRS-ConfigId-NR.
    qcl-DMRSgroup1-TRS parameter-NR
    qcl-DMRSgroup2-TRS-parameter-NR PDCCH resource mapping may be use with quasi-colocation of antenna ports. A UE may be configured, for example, with up to 8 parameter sets containing the QCL information of the DMRS for PDCCH by higher layer signaling to decode future PDCCH per a detected PDCCH with DCI(s) intended for the UE.

The UE may use the parameter set list in the DCIs according to the value of the PDCCH Quasi-Co-Location Indicator field (mapping defined in Table 17 of the Appendix for 1 bit field scenario, Table 18 of the Appendix for 2 bits field scenario, Table 19 of the Appendix for 3 bits field scenario) in the detected PDCCH with DCIs in slot n for determining the QCL relationship of the DMRS for PDCCH with other reference signals applied in slot n+k where k may be specified in the spec or configured by higher layer signaling.

A UE may be configured with one or two DMRS port group(s) based on the number of PDCCH that is monitored. When a UE is configured with one DMRS port group, if the PDCCH Quasi-Co-Location Indicator field is 1 bit, state '0' is configured; if the PDCCH Quasi-Co-Location Indicator field is 2 bits, one of the state '00', '01' is configured; if the PDCCH Quasi-Co-Location Indicator field is 3 bits, one of the state '000', '001', '010', '011' is configured. Each state refers to one RS set, which indicates a QCL relationship for the DMRS port group.

When a UE is configured with two DMRS port groups, if the PDCCH Quasi-Co-Location Indicator field is 1 bit, state '1' is configured; if the PDCCH Quasi-Co-Location Indicator field is 2 bits, one of the state '10', configured; if the PDCCH Quasi-Co-Location Indicator field is 3 bits, one of the state '100', '101', '110', '111' is configured. Each state refers to two RS sets where each RS set indicates a QCL relationship for one of the two DMRS port groups of the UE respectively.

With different value of the PDCCH Quasi-Co-Location Indicator field configured, the UE may determine the QCL information for each DMRS port group such as which RS(s) is QCL-ed and the QCL-ed parameters for each RS from the parameters in the corresponding parameter set configured via higher layer signaling. Note, there may be one or more RS(s) with same or different types in a RS set. If there are more than one RS in a RS set, each of them may associated with different QCL parameters.

A set or subset of the DCI PDCCH Quasi-Co-Location Indicator field parameters in Table 17, Table 18 and Table 19 may be added into the current LTE DCI format 0/1/1A/1B/1C/1D/2/2A/2B/2C for indicating QCL for PDCCH DMRS. However, a set or subset of the above DCI parameters may be also used to form a new DCI format, for example a DCI format for indicating QCL for PDCCH DMRS.

For one DMRS port group configured case, one or more of the following parameters for determining PDCCH antenna port quasi co-location are configured via higher layer signaling for each parameter set:
  qcl-CSI-RS-ConfigNZPId-NR.
  qcl-CSI-RS-parameter-NR
  qcl-SSblock-Index-NR.
  qcl-SSblock-parameter-NR For two DMRS port groups configured case, one or more of the following parameters for determining PDCCH antenna port quasi co-location are configured via higher layer signaling for each parameter set:
  qcl-DMRSgroup1-CSI-RS-ConfigNZPId-NR.
  qcl-DMRSgroup2-CSI-RS-ConfigNZPId-NR.
  qcl-DMRSgroup1-CSI-RS-parameter-NR
  qcl-DMRSgroup2-CSI-RS-parameter-NR
  qcl-DMRSgroup1-SSblock-Index-NR.
  qcl-DMRSgroup2-SSblock-Index-NR.
  qcl-DMRSgroup1-SSblock-parameter-NR
  qcl-DMRSgroup2-SSblock-parameter-NR The UE may perform QCL checking if, for example, a single bit Quasi-Co-Location checking Indicator field (mapping defined in Table 20 of the Appendix) in a corresponding PDCCH with DCI intended for the UE is set to 1.

A set or subset of the DCI Quasi-Co-Location checking Indicator field parameters in Table 20 may be added into the current LTE DCI format 0/1/1A/1B/1C/1D/2/2A/2B/2C for QCL checking. However, a set or subset of the above DCI parameters may be also used to form a new DCI format, for example a DCI format for QCL checking.

One or more of the following parameters for performing Quasi-Co-Location checking are configured via higher layer signaling for the threshold set:
  qcl-AverageGain-Threshold-NR
  qcl-DopplerShift-Threshold-NR
  qcl-DopplerSpread-Threshold-NR
  qcl-AverageDelay-Threshold-NR
  qcl-DelaySpread-Threshold-NR A UE performing Quasi-Co-Location checking may determine if the configured QCL relationship still holds or not. The UE estimates the configured QCL parameters for each RS within a RS set and the DMRS in the corresponding DMRS port group. If all the difference of the estimated QCL parameters is within the threshold, the UE determine the configured QCL relationship holds. If any of the difference of the estimated QCL parameters exceeds the threshold, the UE determine the configured QCL relationship not hold. The UE reports to gNB/TRP and may assume any QCL relationship until next PDCSH Quasi-Co-Location Indicator is configured. If a UE is configured with two DMRS port groups, it may perform the Quasi-Co-Location checking for the two DMRS port groups separately.

A UE may perform aperiodic CSI-RS transmission if, for example, a single bit Aperiodic CSI-RS triggering indicator field in a corresponding PDCCH with DCI intended for the UE is set to 1.

When the Aperiodic CSI-RS triggering indicator, field configured to a UE is set to 1, the UE is configured with up to 4 aperiodic CSI-RS resources by higher layer signaling to decode PDSCH per a detected PDCCH. The UE may use the aperiodic CSI-RS resource per the value of the 'Aperiodic CSI-RS resource indicator' field (mapping defined in Table 21 of the Appendix) in the detected PDCCH for determining the PDSCH RE mapping.

A set or subset of the DCI Aperiodic CSI-RS resource indicator field parameters in Table 21 may be added into the current LTE DCI format 0/1/1A/1B/1C/1D/2/2A/2B/2C for Aperiodic CSI-RS configuration. However, a set or subset of the above DCI parameters may be also used to form a new DCI format, for example a DCI format for Aperiodic CSI-RS configuration.

Each Aperiodic CSI-RS resource may be configured with N out of K NZP/ZP CSI-RS resources or resource sets for aperiodic CSI-RS transmission via higher layer signaling. Each Aperiodic CSI-RS resource may be also configured with the QCL information of the N configured NZP/ZP CSI-RS via the higher layer signaling if it is needed. The QCL information includes the reference signal (may be one or more in same or different types) and the parameters that are QCL-ed associated with each reference signal (for different RS, the QCL-ed parameters may be different).

A UE may perform aperiodic Interference Measurement Resource transmission if, for example, a single bit aperiodic interference measurement resource (IMR) triggering indicator field in a corresponding PDCCH with DCI intended for the UE is set to 1.

When the Aperiodic interference measurement resource (IMR) triggering indicator field configured to a UE is set to 1, the UE is configured with up to 4 aperiodic zero-power CSI-RS resources by higher layer signaling to measure the interference of other TRP/gNB per a detected PDCCH. The UE may use the aperiodic non-zero-power CSI-RS resource per the value of the 'Aperiodic non-zero-power CSI-RS resource indicator' field in the detected PDCCH for determining the PDSCH RE mapping.

DCI may be adjusted to support BWP. The following signaling may be carried in DCI by either enhancing existing DCI field or new DCI format (the number of bits needed and description are shown in Table 22 of the Appendix):
  BWP activation flag: indication of changing BWP
  Reference point: starting begin of BW (in PRB)
  BWP bandwidth: active bandwidth (in PRBs)
  PDSCH starting symbol: PDSCH starting symbol in a slot.

DCI may be adjusted to support multiple TRPs or Panels. A UE may be configured up to N parameter sets lists by RRC and/or MAC-CE signaling to decode multiple PDSCHs by a detected PDCCH with the DCI intended for the UE and the given serving cell. The UE may use the parameter set list per the value of the PDSCH and Quasi-Co-Location Indicator field in the detected PDCCH with DCI for determining PDSCH antenna port quasi co-location and COREST of monitoring single co-schedule PDCCH or multiple PDCCHs. See Table 23 of the Appendix.

Parameter set n configured by RRC and/or MAC-CE may include one or more of the following parameters:
  a cell/TRP's TRS position (number of ports and frequency shift);
  a cell/TRP's numerology, slot and subframe configuration;
  a zero-power CSI-RS (CSI-IM) configuration;
  a value of PDSCH starting symbol;
  a CSI-RS resource index for DMRS quasi-co-location;
  a cell/TRP's SS burst set location; and
  CORESET locations for monitoring single PDCCH or multiple PDCCHs.

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that can be multiplexed together in the same spectrum to address a broad set of 3GPP NR use cases with diverging requirements. The ultra-mobile broadband is expected to include cmWave and mmWave spectrum that may provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

FIG. 1A illustrates one embodiment of an example communications system 100 in which the methods and apparatuses described and claimed herein may be embodied. As shown, the example communications system 100 may include wireless transmit/receive units (WTRUs) 102a, 102b, 102c, and/or 102d (which generally or collectively may be referred to as WTRU 102), a radio access network (RAN) 103/104/105/103b/104b/105b, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d, 102e may be any type of apparatus or device configured to operate and/or communicate in a wireless environment. Although each WTRU 102a, 102b, 102c, 102d, 102e is depicted in FIGS. 1A-1E as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, 102c to facilitate access to one or more communication networks, such as the core network 106/107/109, the Internet 110, and/or the other networks 112. Base stations 114b may be any type of device configured to wiredly and/or wirelessly interface with at least one of the RRHs (Remote Radio Heads) 118a, 118b and/or TRPs (Transmission and Reception Points) 119a, 119b to facilitate access to one or more communication networks, such as the core network 106/107/109, the Internet 110, and/or the other networks 112. RRHs 118a, 118b may be any type of device configured to wirelessly interface with at least one of the WTRU 102c, to facilitate access to one or more communication networks, such as the core network 106/107/109, the Internet 110, and/or the other networks 112. TRPs 119a, 119b may be any type of device configured to wirelessly interface with at least one of the WTRU 102d, to facilitate access to one or more communication networks, such as the core network 106/107/109, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC), a radio network controller (RNC), relay nodes, etc. The base station 114a may be configured to transmit and/or receive wireless signals within a particular geographic region, which may be referred to as a cell (not shown). The base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a may communicate with one or more of the WTRUs 102a, 102b, 102c over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b and/or TRPs 119a, 119b over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b and/or TRPs 119a, 119b may communicate with one or more of the WTRUs 102c, 102d over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c, or RRHs 118a, 118b and TRPs 119a, 119b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A). In the future, the air interface 115/116/117 may implement 3GPP NR technology.

In an embodiment, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114c and the WTRUs 102e, may implement a radio technology such as IEEE 802.11 to establish a wireless local area network (WLAN). In an embodiment, the base station 114c and the WTRUs 102d, may implement a radio technology such as IEEE 802.15 to establish a wireless personal area network (WPAN). In yet another embodiment, the base station 114c and the WTRUs 102e, may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication.

Although not shown in FIG. 1A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d, 102e to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103b/104b/105b or a different RAT.

Some or all of the WTRUs 102a, 102b, 102c, 102d in the communications system 100 may include multi-mode capabilities, e.g., the WTRUs 102a, 102b, 102c, 102d, and 102e may include multiple transceivers for communicating with different wireless networks over different wireless links. For example, the WTRU 102e shown in FIG. 1A may be configured to communicate with the base station 114a, which may employ a cellular-based radio technology, and with the base station 114c, which may employ an IEEE 802 radio technology.

Figure 1B:
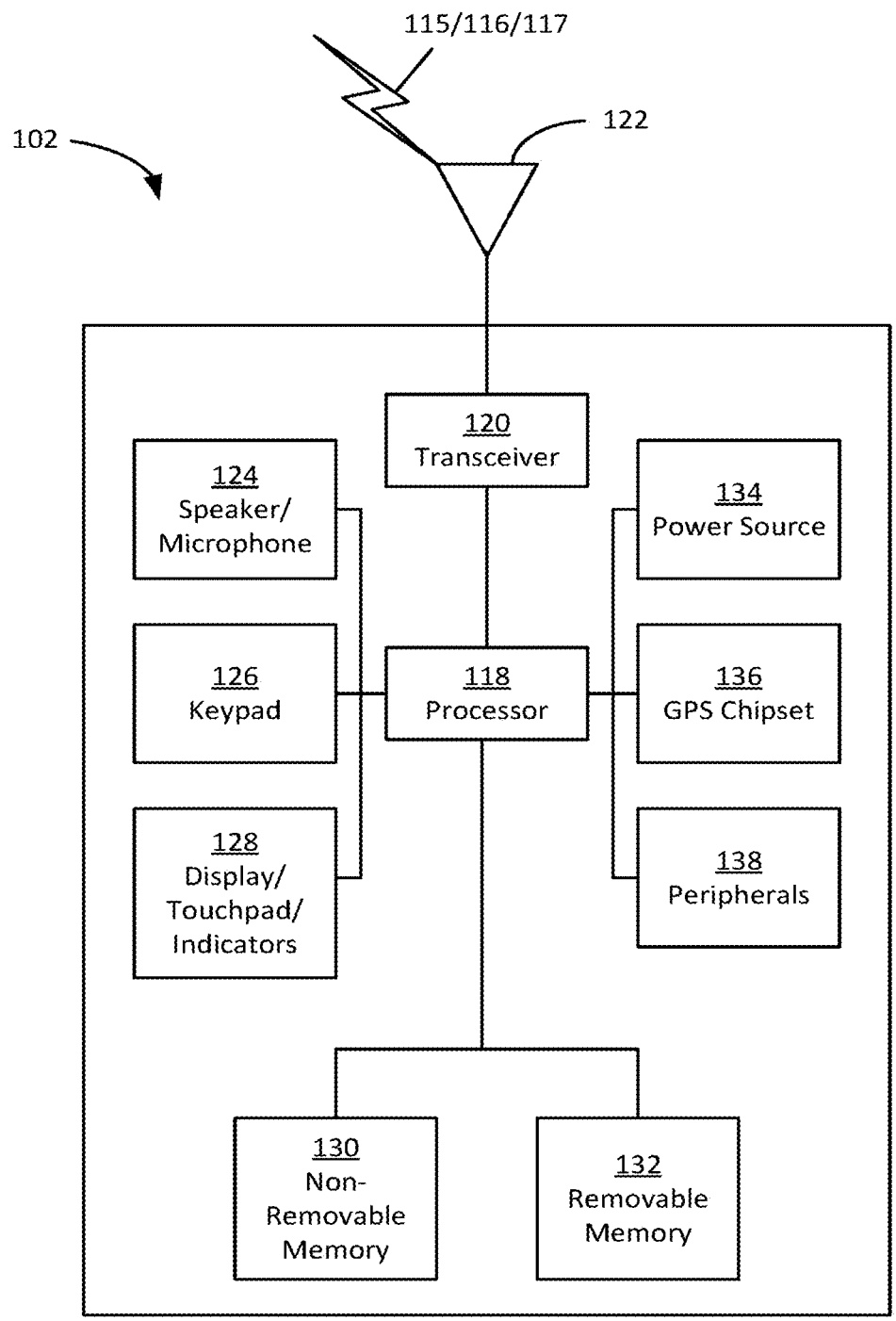
FIG. 1B is a block diagram of an example apparatus or device configured for wireless communications such as, for example, a wireless transmit/receive unit (WTRU).

FIG. 1B is a block diagram of an example apparatus or device configured for wireless communications in accordance with the embodiments illustrated herein, such as for example, a WTRU 102. As shown in FIG. 1B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 1C:
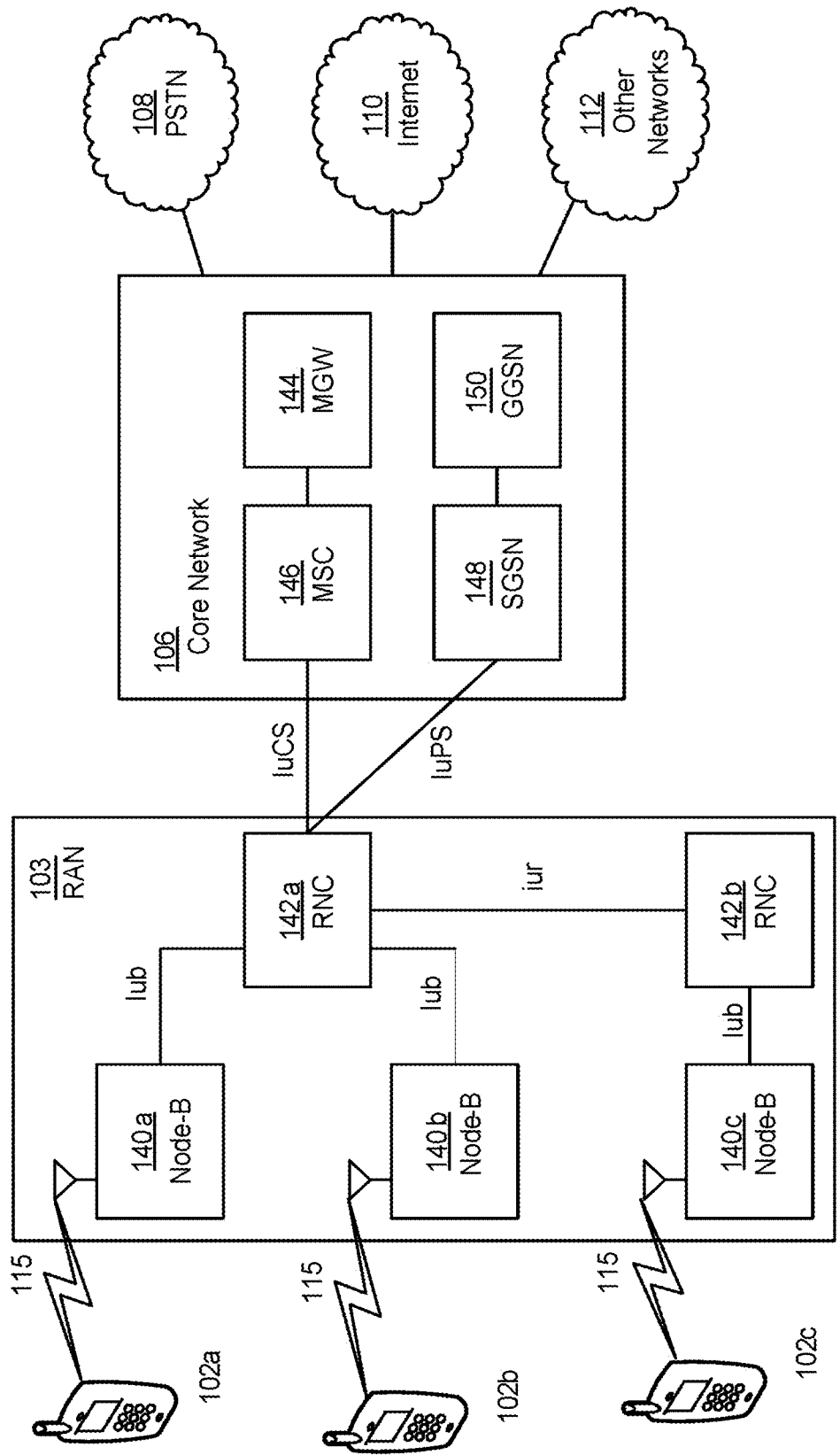
FIG. 1C is a system diagram of a first example radio access network (RAN) and core network.

FIG. 1C is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140*a*, 140*b* may be in communication with the RNC 142*a*. Additionally, the Node-B 140*c* may be in communication with the RNC 142*b*. The Node-Bs 140*a*, 140*b*, 140*c* may communicate with the respective RNCs 142*a*, 142*b* via an Iub interface. The RNCs 142*a*, 142*b* may be in communication with one another via an Iur interface. Each of the RNCs 142*a*, 142*b* may be configured to control the respective Node-Bs 140*a*, 140*b*, 140*c* to which it is connected. In addition, each of the RNCs 142*a*, 142*b* may be configured to carry out or support other functionality, such as outer loop power control, load control, admission control, packet scheduling, handover control, macro-diversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142*a* in the RAN 103 may be connected to the MSC 146 in the core network 106 via an IuCS interface. The MSC 146 may be connected to the MGW 144. The MSC 146 and the MGW 144 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices.

The RNC 142*a* in the RAN 103 may also be connected to the SGSN 148 in the core network 106 via an IuPS interface. The SGSN 148 may be connected to the GGSN 150. The SGSN 148 and the GGSN 150 may provide the WTRUs 102*a*, 102*b*, 102*c* with access to packet-switched networks, such as the Internet 110, to facilitate communications between and the WTRUs 102*a*, 102*b*, 102*c* and IP-enabled devices.

As noted above, the core network 106 may also be connected to the networks 112, which may include other wired or wireless networks that are owned and/or operated by other service providers.

Figure 1D:
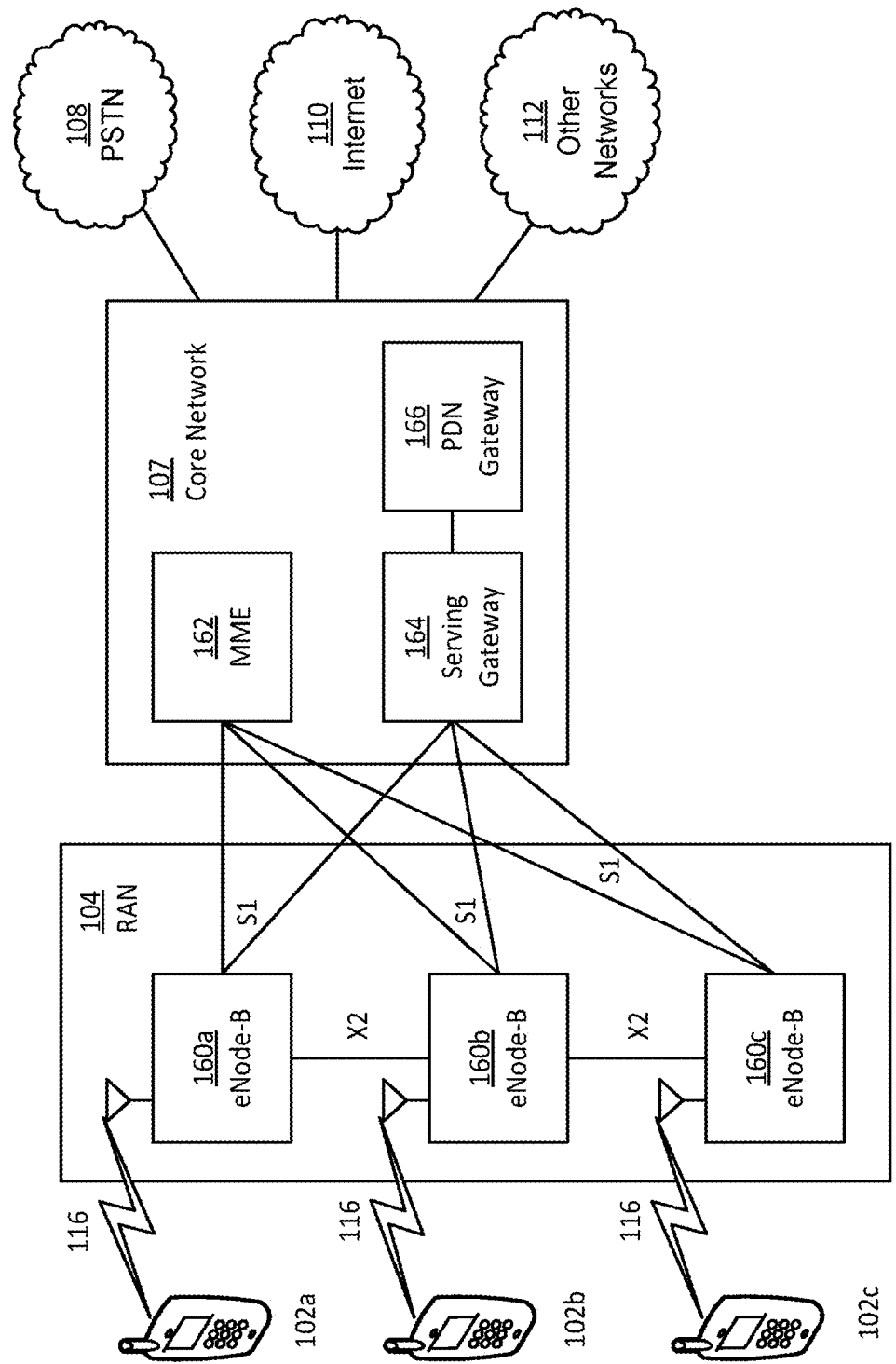
FIG. 1D is a system diagram of a second example radio access network (RAN) and core network.

FIG. 1D is a system diagram of the RAN 104 and the core network 107 according to an embodiment. As noted above, the RAN 104 may employ an E-UTRA radio technology to communicate with the WTRUs 102*a*, 102*b*, and 102*c* over the air interface 116. The RAN 104 may also be in communication with the core network 107.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In an embodiment, the eNode-Bs 160*a*, 160*b*, 160*c* may implement MIMO technology. Thus, the eNode-B 160*a*, for example, may use multiple antennas to transmit wireless signals to, and receive wireless signals from, the WTRU 102*a*.

Each of the eNode-Bs 160*a*, 160*b*, and 160*c* may be associated with a particular cell (not shown) and may be configured to handle radio resource management decisions, handover decisions, scheduling of users in the uplink and/or downlink, and the like. As shown in FIG. 1D, the eNode-Bs 160*a*, 160*b*, 160*c* may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160*a*, 160*b*, and 160*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160*a*, 160*b*, and 160*c* in the RAN 104 via the S1 interface. The serving gateway 164 may generally route and forward user data packets to/from the WTRUs 102*a*, 102*b*, 102*c*. The serving gateway 164 may also perform other functions, such as anchoring user planes during inter-eNode B handovers, triggering paging when downlink data is available for the WTRUs 102*a*, 102*b*, 102*c*, managing and storing contexts of the WTRUs 102*a*, 102*b*, 102*c*, and the like.

The serving gateway 164 may also be connected to the PDN gateway 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The core network 107 may facilitate communications with other networks. For example, the core network 107 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102*a*, 102*b*, 102*c* with access to the networks 112, which may include other wired or wireless networks that are owned and/or operated by other service providers.

Figure 1E:
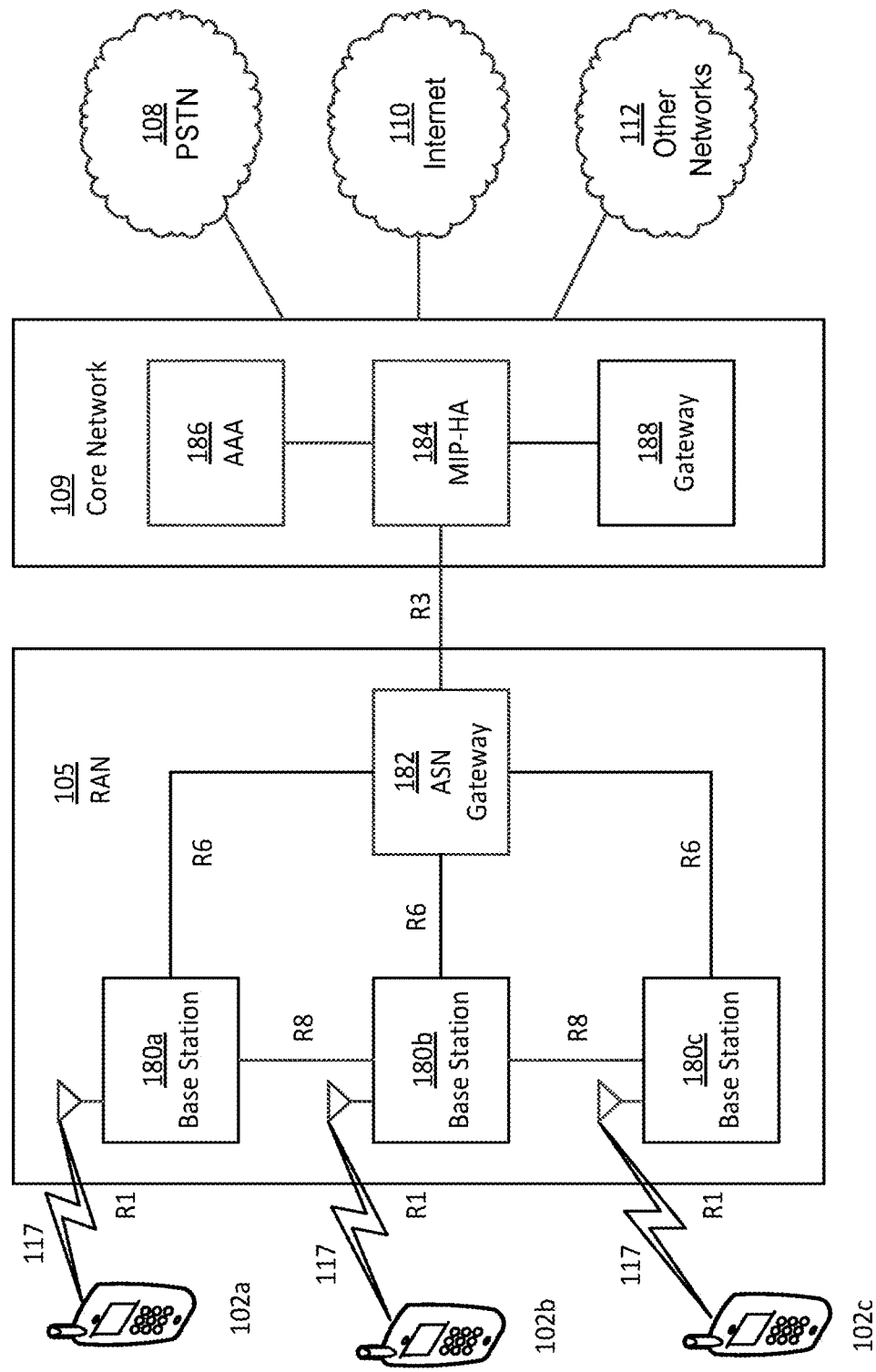
FIG. 1E is a system diagram of a third example radio access network (RAN) and core network.

FIG. 1E is a system diagram of the RAN 105 and the core network 109 according to an embodiment. The RAN 105 may be an access service network (ASN) that employs IEEE 802.16 radio technology to communicate with the WTRUs 102*a*, 102*b*, and 102*c* over the air interface 117. As will be further discussed below, the communication links between the different functional entities of the WTRUs 102*a*, 102*b*, 102*c*, the RAN 105, and the core network 109 may be defined as reference points.

As shown in FIG. 1E, the RAN 105 may include base stations 180*a*, 180*b*, 180*c*, and an ASN gateway 182, though it will be appreciated that the RAN 105 may include any number of base stations and ASN gateways while remaining consistent with an embodiment. The base stations 180*a*, 180*b*, 180*c* may each be associated with a particular cell in the RAN 105 and may include one or more transceivers for communicating with the WTRUs 102*a*, 102*b*, 102*c* over the air interface 117. In an embodiment, the base stations 180*a*, 180*b*, 180*c* may implement MIMO technology. Thus, the base station 180*a*, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 1A, 1C, 1D, and 1E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 1A, 1B, 1C, 1D, and 1E are provided by way of example only, and it is understood that the subject matter disclosed and claimed herein may be embodied or implemented in any similar communication system, whether presently defined or defined in the future.

Figure 1F:
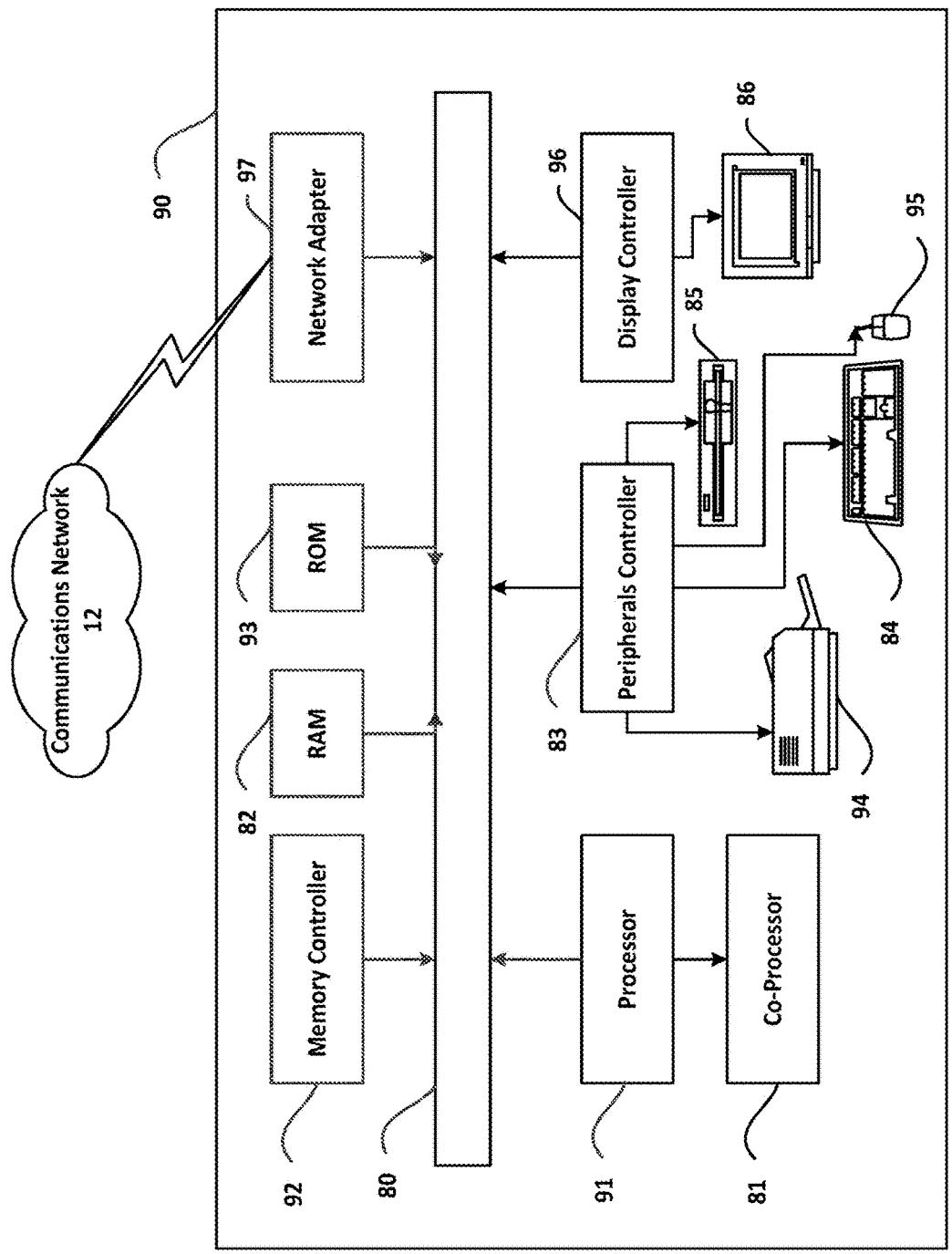
FIG. 1F is a block diagram of an exemplary computing system in which one or more apparatuses of communications networks may be embodied, such as certain nodes or functional entities in the RAN, core network, public switched telephone network (PSTN), Internet, or other networks.

FIG. 1F is a block diagram of an exemplary computing system 90 in which one or more apparatuses of the communications networks illustrated in FIGS. 1A, 1C, 1D and 1E may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 1A, 1B, 1C, 1D, and 1E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computing system.

TABLE 1

| Abbreviations | |
|---|---|
| ACK | Acknowledgement |
| BFRR | Beam Failure Recovery Request |
| BWP | Band Width Part |
| CBG | Code Block Group |
| CQI | Channel Quality Indicator |
| CRC | Cyclic Redundancy Check |
| C-RNTI | Cell RNTI |
| CSI-RS | Channel-State Information - Reference Signal |
| DCI | Downlink Control Information |
| DL | Downlink |
| DMRS | DeModulation Reference Signal |
| eNB | Evolved Node B |
| FDM | Frequency Division Multiplex |
| gNB | next generation NodeB, 5G access network |
| HARQ | Hybrid Automatic Repeat request |
| IMR | Interference Measurement Resource |
| LAA | Licensed-Assisted Access |
| LTE | Long Term Evolution |
| MAC | Medium Access Control |
| MAC CE | MAC Control Element |
| MCCH | Multicast Control Channel |
| MIMO | Multiple Input Multiple Output |
| MPDCCH | MTC Physical Downlink Control Channel |
| MTC | Machine-Type Communications |
| NACK | Negative Acknowledgement |
| NR | New Radio |
| OFDM | Orthogonal Frequency Division Multiplex |
| PDCCH | Physical Downlink Control Channel |
| PDSCH | Physical Downlink Shared Channel |
| PHY | Physical Layer |
| PRACH | Physical Random Access Channel |
| PRB | Physical Resource Block |
| PSCCH | Physical Sidelink Control Channel |
| PSSCH | Physical Sidelink Shared Channel |
| PUCCH | Physical Uplink Control Channel |
| PUSCH | Physical Uplink Shared Channel |
| QCL | Quasi-Co-Location |
| RAN | Radio Access Network (3GPP) |
| RAT | Radio Access Technology (3GPP) |
| RB | Resource Block |
| RBG | Resource Block Group |
| RNTI | Radio Network Temporary Identifier |
| RRC | Radio Resource Control |
| SCell | Secondary Cell |
| SCI | Sidelink Control Information |
| SC-MCCH | Single Cell-MCCH |
| SI | System Information |
| SIMO | Single Input Multiple Output |
| SPS-RNTI | Semi-Persistent Scheduling RNTI |
| TA | Timing Advance |
| TDD | Time Division Duplex |
| TM | Transmission Mode |
| TPC | Transmit Power Control |
| TRA | Time Resource Allocation |
| TRP | Transmission and Reception Point |
| UE | User Equipment |
| UL | Uplink |

TABLE 2

Parameters for Time Resource Allocation

| Parameters | | Bits | Description |
|---|---|---|---|
| BWP 0/ TRP 0/ Carrier 0/ RAT 0 | Slot/Subframe Aggregation Flag | 1 | Either Slot or Subframe aggregation is configured via RRC message.<br>0: no aggregation<br>1: aggregation<br>Note: if this flag is not presented, it is default to no aggregation, for example slot or subframe based scheduling |

TABLE 2-continued

Parameters for Time Resource Allocation

| Parameters | Bits | Description |
|---|---|---|
| Slot 0/ Subframe 0 Index | $n_{slot}$ or $n_{sf}$ | 1) The slot index referenced from<br>• Current subframe, for example 1 ms time boundary,<br>   $n_{slot}$ = 0 bit: for subframe reference with 15k Subcarrier Spacing (SC), for example one 14-symbol slot in a subframe.<br>   $n_{slot}$ = 1 bit: for subframe reference with 30k Subcarrier Spacing (SC), for example two 14-symbol slots in a subframe with the slot index values as the follows<br>     ○ "0" for Slot 0<br>     ○ "1" for Slot 1.<br>   $n_{slot}$ = 2 bits for subframe reference with 60k Subcarrier Spacing (SC), for example four 14-symbol slots in a subframe with the slot index values as the follows<br>     ○ "00" for Slot 0<br>     ○ "01" for Slot 1<br>     ○ "10" for Slot 2<br>     ○ "11" for Slot 3<br>   $n_{slot}$ = 3 bits for subframe reference with 120k Subcarrier Spacing (SC), for example eight 14-symbol slots in a subframe with the slot index values as the follows<br>     ○ "000" for Slot 0<br>     ○ "001" for Slot 1<br>     ○ . . .<br>     ○ "111" for Slot 7<br>   $n_{slot}$ = 4 bits for subframe reference with 120k Subcarrier Spacing (SC), for example sixteen 14-symbol slots in a subframe with the slot index values as the follows<br>     ○ "0000" for Slot 0<br>     ○ "0001" for Slot 1<br>     ○ . . .<br>     ○ "1111" for Slot 15.<br>• NR-PDCCH carrying this DCI<br>   The bits $n_{slot}$ and the slot index values are similar to the above examples referenced to the current subframe<br>• System Frame Number (SFN), for example 10 ms time boundary<br>   The n bits may be $n_{subframe}$ + 4, where the $n_{subframe}$ is the bits referenced from current subframe.<br>2) The subframe index referenced from<br>• Current System Frame Number (SFN), for example 10 ms time boundary<br>   For example, the bits $n_{sf}$ may be 4, with the subframe index values as the follows<br>     ○ "0000" for Subframe 0<br>     ○ "0001" for Subframe 1<br>     ○ . . .<br>     ○ "1001" for Subframe 9.<br>Note: if this field is not presented, it is default to current slot or subframe. |
| Symbol Allocation within Slot 0/ Subframe 0 | $n_{sym}$ | 1) Contiguous Allocation: for example, $n_{sym}$ = 8<br>   Where 4 bits for Start Symbol/Offset Index referenced from the slot/subframe or the PDCCH carrying the DCI. The index value may be<br>     ○ "0000" for Symbol 0<br>     ○ "0001" for Symbol 1<br>     ○ . . .<br>     ○ "1101" For Symbol 13.<br>• Where 4 bits for End Symbol/Symbol Range within a slot/subframe. The index value may be<br>     ○ "0000" for Symbol 0/range = 1 symbol<br>     ○ "0001" for Symbol 1/range = 2 symbols<br>     ○ . . .<br>     ○ "1101" For Symbol 13/range = 14 symbols.<br>2) Periodic Allocation: for example, $n_{sym}$ = 9<br>• 4 bits for Start Symbol/Offset Index referenced from the slot/subframe or the PDCCH carrying the DCI<br>• 3 bits for symbols allocated contiguously<br>     ○ "000" for 0 symbol<br>     ○ "001" for 1 symbol<br>     ○ . . .<br>     ○ "111" For 7 symbols<br>• 2 bits for period with the following values as an example<br>     ○ "00" for 2 symbols<br>     ○ "01" for 3 symbols<br>     ○ "10" for 4 symbols<br>     ○ "11" For 6 symbols.<br>3) Distributed Segmented: for example, $n_{sym}$ = 10~12<br>• 4~5 bits for Segment 1 which contains 2~3 bits for Start Symbol referenced from the slot/subframe or the NR-PDCCH carrying the DCI and 2 bits for Segment Range<br>• 4~5 bits for Segment 2 which contains 2~3 bits for Start Symbol reference from |

TABLE 2-continued

Parameters for Time Resource Allocation

| | Parameters | Bits | Description |
|---|---|---|---|
| | | | the end of the gap and 2 bits Symbol Range<br>• 2 bits for Gap in symbols<br>4) Distributed Bitmap: for example, $n_{sym} = 14$<br>Where total 14 bits each represent a symbol within a 14-symbol slot, where the MSB for Symbol 0 and LSB for Symbol 13. Value "0" for not allocated, and value "1" for allocated. For example, "11110_01110_0011" is for allocation at symbol 0~3, symbol 6~8, and symbol 12~13. |
| | Slot 1/<br>Subframe 1<br>Index | $n_{slot1}$<br>or<br>$n_{sf1}$ | Same as the Slot 0/Subframe 0<br>Notes:<br>1) For current slot/subframe scheduling, this field is not needed.<br>2) For slot/subframe aggregated scheduling, this field is not needed if the time resource allocation pattern is the same as the Slot 0/Subframe 0. |
| | Symbol Allocation within Slot 1/<br>Subframe 1 | $n_{sym1}$ | Same as the Slot 0/Subframe 0<br>Notes:<br>1) For current slot/subframe scheduling, this field is not needed.<br>2) For slot/subframe aggregated scheduling, this field is not needed if the time resource allocation pattern is the same as the Slot 0/Subframe 0. |
| | Slot 2/<br>Subframe 2<br>Index | $n_{slot2}$<br>or<br>$n_{sf2}$ | Same as the Slot 0/Subframe 0 |
| | . . . | . . . | . . . |
| BWP 1/<br>TRP 1/<br>Carrier 1/<br>RAT 1 | Slot 0/<br>Subframe 0<br>Index | $n_{slot11}$<br>or<br>$n_{sf11}$ | Same as the BWP 0/TRP 0/Carrier 0/RAT 0<br>Notes:<br>1) For current slot/subframe scheduling, this field is not needed if the time resource allocation pattern is the same as the BWP 0/TRP 0/Carrier 0/RAT 0. |
| | Symbol Allocation within Slot 0/<br>Subframe 0 | $n_{sym11}$ | Same as the BWP 0/TRP 0/Carrier 0/RAT 0<br>Notes:<br>For current slot/subframe scheduling, this field is not needed if the time resource allocation pattern is the same as the BWP 0/TRP 0/Carrier 0/RAT 0. |
| | . . . | . . . | . . . |

TABLE 3

Parameters for Frequency Resource Allocation

| | Parameters | Bits | Description |
|---|---|---|---|
| BWP 0/<br>TRP 0/<br>Carrier 0/<br>RAT 0 | BWP Hopping Flag | 1 | For inter-BWP hopping: "0" hopping within a BWP; "1" hopping between BWPs.<br>Note: if this flag is not presented, it is default to no inter-BWP hopping. |
| | Slot Hopping Flag | 1 | "0" no slot hopping; "1" slot hopping between BWPs.<br>Note: if this flag is not presented, it is default to no slot hopping |
| | Hopping Pattern | 3 | MSB is for inter-slot with "1" or intra-slot hopping with "0". The following is an example of the possible values.<br>"0_00": intra-slot hopping type 0<br>. . .<br>"0_11": intra-slot hopping type 3<br>"1_00": inter-slot hopping type 0<br>. . .<br>"1_11": inter-slot hopping type 3<br>Note: if this flag is not presented, no hopping is enabled |
| | PRB/<br>RBG<br>Allocation | n | 1) Contiguous Allocation with PRB/RBG<br>• Total $n = n_{PRB}$ bits for PRB allocation depending on the size of allocated bandwidth or BWP,<br>$n_{PRB} = n_{PRBstart} + n_{PRBend}/n_{PRBrange}$,<br>where $n_{PRBstart}$ is for start PRB index or frequency offset in PRBs referenced from PRB 0 of the system band, $n_{PRBend}$ is for end PRB index referenced from the start PRB or $n_{PRBrange}$ is the range in PRB from the start PRB.<br>• Total $n = n_{RBG}$ bits for RBG allocation depending on the size of allocated bandwidth or BWP,<br>$n_{RBG} = n_{RBGstart} - n_{RBGend}/n_{RBGrange}$,<br>where $n_{RBGstart}$ is for start RBG index or frequency offset in RBGs referenced from PRB 0 of the system band, $n_{RBGend}$ is for end RBG index referenced from the start RBG or $n_{RBGrange}$ is the range in RBG from the start RBG.<br>Note: the relationship between PRB and RBG is as the follows<br>$n_{RBG} = n_{PRB} - \log_2(RBG\_size)$,<br>where RBG = PRB with RBG_size = 1, RBG = 2 PRBs with RBG_size = 2, RBG = 4 PRBs with RBG_size = 4, etc.<br>2) Contiguous or Noncontiguous Allocation with RBG Bitmap, for example the type 0 for LTE DL resource allocation. See, |

TABLE 3-continued

Parameters for Frequency Resource Allocation

| Parameters | | Bits | Description |
|---|---|---|---|
| | | | for example, 3GPP TS 36.213, Physical layer procedures (Release 14), V14.3.0.<br>3) Contiguous or Noncontiguous Allocation with RBG Set Based, for example the type 1 for LTE DL resource allocation. See, for example, 3GPP TS 36.213<br>4) Contiguous or Noncontiguous Allocation with Virtual RB (VRB), for example the type 2 for LTE DL "Localized" for contiguous and "Distributed" for noncontiguous. See, for example, 3GPP TS 36.213<br>Note: for UL DFT-s-OFDM waveform, only contiguous allocation is used, and for UL CP-OFDM waveform, both contiguous and noncontiguous allocation may be used as the DL frequency resource allocation. |
| BWP 1/<br>TRP 1/<br>Carrier 1/<br>RAT 1 | Slot<br>Hopping<br>Flag | 1 | Same as the BWP 0/TRP 0/Carrier 0/RAT 0<br>Note: this field is not needed if the frequency resource allocation pattern is the same as the BWP 0/TRP 0/Carrier 0/RAT 0. |
| | Hopping<br>Pattern | 3 | Same as the BWP 0/TRP 0/Carrier 0/RAT 0<br>Note: this field is not needed if the frequency resource allocation pattern is the same as the BWP 0/TRP 0/Carrier 0/RAT 0. |
| | PRB/<br>RBG<br>Allocation | n1 | Same as the BWP 0/TRP 0/Carrier 0/RAT 0<br>Note: this field is not needed if the frequency resource allocation pattern is the same as the BWP 0/TRP 0/Carrier 0/RAT 0. |

TABLE 4

Parameters for Time Resource Allocation of Mini-slot(s)

| Parameters | | Bits | Description |
|---|---|---|---|
| Slot 0 | Slot 0 Index | $n_{slot}$ | See Table 2 and associated discussion of time resource allocation. |
| | Mini-slot<br>Allocation<br>within Slot 0 | $n_{minis}$ | 1) One or Repeated Mini-slot Allocation<br>The $n_{minis}$ may contain the following sub-fields. For example,<br>$n_{ministart}$: 2~4 bits for the symbol index of the start location of the first mini-slot within the slot referenced from the slot or the NR-PDCCH carrying the DCI.<br>$n_{minilength}$: 2~3 bits for the length in symbols of the mini-slot in symbol(s) referenced from the start symbol.<br>$n_{minigap}$: 1~2 bits for the gap in symbols between repeated mini-slots in symbol(s) referenced from the previous mini-slot.<br>$n_{minirepeat}$: 2~3 bits for the repeated mini-slots within a slot. For example, "0" is for no repeat, "1" is for repeat once, etc.<br>2) Periodic Mini-slot Allocation<br>The $n_{minis}$ may contain the following sub-fields. For example,<br>$n_{ministart}$: 2~4 bits for the symbol index of the start location of the first mini-slot within the slot referenced from the slot or the NR-PDCCH carrying the DCI.<br>$n_{minilength}$: 1~2 bits for the length in symbols of the mini-slot in symbol(s) referenced from the start symbol.<br>$n_{miniperiod}$: 2~3 bits for the period in symbols between repeated mini-slots in symbol(s) referenced from the previous mini-slot.<br>3) Distributed Mini-slot Allocation<br>The $n_{minis}$ may be 14 bits for mini-slot bitmap. For example, "00011_10110_1110" is for mini-slot 0 with symbol 3~5, mini-slot with symbol 7~8, and mini-slot with symbol 10~12. |
| Slot 1 | Slot 1 Index | $n_{slot1}$ | Same as the Slot 0<br>Note: this field is not needed if the mini-slot allocation pattern is the same as the slot 0. |
| | Mini-slot<br>Allocation<br>within Slot 1 | $n_{minis1}$ | Same as the Slot 0<br>Note: this field is not needed if the mini-slot allocation pattern is the same as the slot 0. |

TABLE 5

Parameters for CBG Transmission

| Parameters | | Bits | Description |
|---|---|---|---|
| Slot 0 | CBG<br>(Re)/<br>transmission<br>Indication | $n_{CBGTI}$<br>or<br>$n_{CBGFI}$ | $n_{CBGTI}$ is for bitmap for indicating $n_{CBGTI}$ CBGs' (re)transmission within the slot.<br>$n_{CBGFI}$ is a flag for indicating CBG soft buffer flushing within |

TABLE 5-continued

Parameters for CBG Transmission

| Parameters | Bits | Description |
|---|---|---|
| Or CBG Flush Indication | | the slot. $1 < n_{CBGFI} <=$ number of the CBGs configured if shared with the same field with CBTI. |
| Slot 1 CBG (Re)/ transmission Indication Or CBG Flush Indication | $n_{CBGTI1}$ or $n_{CBGFI1}$ | Note: this field is not needed if the pattern is the same as the slot 0. |

TABLE 6

Example of a DCI for UL Mini-slot

| DCI Sub-fields | Bits | Comment |
|---|---|---|
| UL mini-slot Allocation | $n_{ULmini}$ | UL mini-slot allocation for one or multiple mini-slots within the current slot or next few slots, as described previously for the DCI field used for Mini-slot allocation in reference to Table 4. |
| Frequency Hopping Flag | 1 | "0" for no frequency hopping; "1" for inter-mini-slot frequency hopping. |
| Frequency Hopping Pattern | $n_{hop}$ | Inter-mini-slot frequency hopping patterns. Typically, $n_{hop}$ = 2~3 bits. |
| UL Resource block assignment | $n_{PRBminiUL}$ or $n_{RBGminiUL}$ | Contiguous or noncontiguous PRB/RBG allocation as described in reference to Table 3 for frequency resource allocation. Note: contiguous allocation may be used for DFT-s-OFDM waveform and both contiguous and noncontiguous allocation may be used for PC-OFDM waveform |
| MCS and RV | 5 | Modulation and coding scheme and redundancy version |
| NDI (New Data Indicator) | 1 | To indicate a new data transmission or not |
| HARQ process number | $n_{HARQ}$ | HARQ process number, typically $n_{HARQ}$ = 2~3. |
| TPC for PUSCH | 2 | Transmit power control command for scheduled PUSCH or PUCCH |
| Cyclic shift for DM RS | 3 | Cyclic shift for DM RS and OCC index and IFDMA configuration |
| UL SPS configuration index | $n_{SPS}$ | For UE's UL SPS configuration, typically $n_{SPS}$ = 3 bits. |
| CSI request | $n_{CSI}$ | For UE's CSI-RS measurement report configuration index, typically $n_{CSI}$ = 3~4. |
| SRS request | 0~1 | Used for scheduling a PUSCH transmission with SRS or not. |

TABLE 7

Example of a DCI for DL Mini-slot

| DCI Sub-fields | Bits | Comment |
|---|---|---|
| DL mini-slot Allocation | $N_{DLmini}$ | DL mini-slot allocation for one or multiple mini-slots within the current slot or next few slots, as described previously for the DCI field used for Mini-slot allocation in reference to Table 4. |
| DL Resource block assignment | $n_{PRBminiDL}$ or $n_{RBGminiDL}$ | Contiguous or noncontiguous PRB/RBG allocation as described in reference to Table 3. for frequency resource allocation. |
| MCS | 5 | Modulation and coding scheme |
| HARQ Process | 3 | HARQ process number |
| NDI | 1 | New data indicator |
| RV | 2 | Redundancy version |
| TPC for PUCCH | 2 | Transmit power control for PUCCH |
| HARQ-ACK resource | $n_{HARQr}$ | HARQ/ACK resource allocation, typically $n_{HARQr}$ = 2 |
| TPMI | $n_{TPMI}$ | Transmitted Precoding Matrix Indicator (TPMI) information for precoding |
| PMI | $n_{PMI}$ | Precoding Matrix Indicator (PMI) confirmation for precoding |

TABLE 7-continued

Example of a DCI for DL Mini-slot

| DCI Sub-fields | Bits | Comment |
|---|---|---|
| DL Reference Signal (RS) Configuration | $n_{DLRS}$ | DL RS configuration for measurements used for beam management, mobility management, Channel Stat Information measurement, time and/or frequency tracking and correction, etc. Typically, $n_{DLRS}$ = 4~6 bits. |

TABLE 8A

Example of a DCI for UL Group Common PDCCH

| DCI Sub-fields | Bits | Comment |
|---|---|---|
| Slot Format Indication (SFI) | $n_{SFIindex}$ | Index of a lookup table containing all the possible configurations of a slot in terms of DL symbols, UL symbols, gap, and reserved, and/or unknown symbols. |
| Reserved bits | $n_{reserved}$ | Bits reserved for forward compatibility |

TABLE 8B

Example of a DCI for SFI over Multiple Slots in a Group Common PDCCH

| DCI Sub-fields | Bits | Comment |
|---|---|---|
| Slot Format Indication index (SFI) | $n_{SFIindex}$ | Index of a lookup table containing all the possible configurations of a slot in terms of DL symbols, UL symbols, gap, and reserved, and/or unknown symbols. |
| Reserved bits | $n_{reserved}$ | Bits reserved for forward compatibility |
| Number of slots | $n_{slots}$ | Applicable to $2^{nslots}$ slots |

TABLE 8C

Example of a Preemption Indication through Group Common PDCCH

| DCI Sub-fields | Bits | Comment |
|---|---|---|
| x symbols | $n_x$ | $\log_2(x_{max})$ bits are configured to indicate number of contiguous symbols pre-empted. $x <= x_{max}$ |
| Starting symbol number | $n_{st, symb}$ | $n_{st, symbol}$ is a symbol index within a slot. For example, it goes from 0 to 13 in a 14-symbol slot. |
| y RBs | $n_y$ | $\log_2(y_{max})$ bits are configured to indicate number of RBs. $y <= y_{max}$ |

TABLE 8C-continued

Example of a Preemption Indication through Group Common PDCCH

| DCI Sub-fields | Bits | Comment |
|---|---|---|
| Starting RB number within a reference BWP | $n_{st, RB}$ | $n_{st, RB}$ is a RB index within a BWP. |

TABLE 8D

Example of a Preemption Indication through Group Common PDCCH

| DCI Sub-fields | Bits | Comment |
|---|---|---|
| Starting symbol number | $n_{st, symb}$ | $n_{st, symbol}$ is an index within a slot. For example, it goes from 0 to 13 in a 14-symbol slot. |
| Starting RB number within a reference BWP | $n_{st, RB}$ | $n_{st, RB}$ is a RB index within a BWP. |

TABLE 8E

Example of a Preemption Indication through Group Common PDCCH

| DCI Sub-fields | Bits | Comment |
|---|---|---|
| Starting symbol number | $n_{st, symb}$ | $n_{st, symbol}$ is an index within a slot. For example, it goes from 0 to 13 in a 14-symbol slot. |
| Starting RB number within a reference BWP | $k_{max}*n_{st, RB}$ | $n_{st, RB}$ is a RB index within a set of up to $k_{max}$ sets in one or multiple BWP. When $k < k_{max}$ the extra bits are set to 0 |

TABLE 9

Example of a DCI Format 0D for Grant-free Resource Allocation

| DCI Sub-fields | Bits | Comment |
|---|---|---|
| Carrier/BWP Indicator | 0 or 3 | Multi-carriers or BWP indication. |
| Flag for format0D/format1A differentiation | 1 | "0" for Format 0D |
| Time Resource Allocation | $n_{time}$ | Contiguous or noncontiguous time resource allocation. See Table 1 and associated discussion. An example is described below specifically for Grant-free type 2. $n_{time}$ bits for time resource allocation for Grant-free which may contain the following bits.<br>• $n_{start}$: start symbol index or time offset referenced from the slot or subframe boundary or the NR-PDCCH carrying the DCI for activation.<br>• $n_{symb}$: end symbol index or the length in symbols for time resource allocation<br>• $n_{period}$: the period in symbols for periodic time |

TABLE 9-continued

Example of a DCI Format 0D for Grant-free Resource Allocation

| DCI Sub-fields | Bits | Comment |
|---|---|---|
| | | allocation within a slot or subframe.<br>Example: for a 14-symbol slot, the periodic time allocation may be as such, starting from symbol 3, allocated 3 symbols, then repeated with period of 5 symbols within the slot.<br>Notes:<br>• Both $n_{symb}$ and $n_{period}$ may also be configured by the RRC, but the dynamically signaled value overrides the statically configured values.<br>• If $n_{period}$ is not presented, it's a contiguous allocation with $n_{start}$ and $n_{symb}$. |
| Frequency Hopping Flag | 1 | "0" for no frequency hopping; "1" for inter-mini-slot frequency hopping. |
| Frequency Hopping Pattern | $n_{hop}$ | Inter-mini-slot frequency hopping patterns.<br>Typically, $n_{hop}$ = 2~3 bits. |
| Frequency Resource Allocation | $N_{freq}$ | Contiguous or noncontiguous PRB/REG allocation may be used as exemplified in Table 3. |
| MCS and RV | 5 | Modulation and coding scheme and redundancy version |
| NDI (New Data Indicator) | 1 | Indicate new transmission or not by toggling the bit. |
| TPC for PUSCH | 2 | for Grant-free UL power control |
| Cyclic shift for DM RS | n | for Grant-free UE's DMRS |
| UL SPS configuration index | 3 | for Grant-free UL SPS configuration |
| UL index (TDD only) | 3 | for Grant-free UL in TDD |
| Downlink Assignment Index (DAI) | 2 | for Grant-free UL in TDD |
| CSI request (1 or 2 bits: 2 bit is for multi carrier) | 1, 2 | for Grant-free UL CSI if configured |
| SRS request | 3 | for Grant-free UL SRS |
| Cyclic Shift Field mapping for DMRS | 1 | For Grant-free UE's DMRS |
| Beam Indicator | 2~4 | To indicate beam association, pairing, and/or QCL, for example beam index, beam pair index, etc. |
| Transport block size | 4 | Configure the TBS value(s) for each Grant-free resource allocation |
| Repetition number | 3 | Max. repetition K |
| HARQ process number | 3 | Support up to 8 HARQs |
| Channel Access type | 1 | Contention or non-contention |
| Channel Access Priority Class | 2 | Contention based priority accessing |

TABLE 10A

Example of a DCI for Grant-free HARQ-ACK Feedback

| DCI Sub-fields | Bits | Comment |
|---|---|---|
| HARQ ACK/NACK feedback | 1 | "0" for NACK, and "1" for ACK. |
| HARQ ID | $n_{HARQ}$ | HARQ_ID may be derived from the time and frequency resource, for example,<br>HARQ_ID = (t mod $2^{nfreq}$ + f × $2^{nfreq}$) mod $n_{HARQ}$, or<br>HARQ_ID = (t × $2^{ntime}$ + f mod $2^{ntime}$) mod $n_{HARQ}$,<br>or from time, frequency and UE ID, for example,<br>HARQ_ID = [(t mod $2^{nfreq}$ + f × $2^{nfreq}$) + UE-ID] mod $n_{HARQ}$<br>HARQ_ID = [(t × $2^{ntime}$ + f mod $2^{ntime}$) + UE-ID] mod $n_{HARQ}$,<br>where 2 < $n_{freq}$ < $n_{HARQ}$, 2 < $n_{time}$ < $n_{HARQ}$, t is the time resource ID (for example a slot and/or symbol index for time resource allocation) and f is the frequency resource ID (for example a PRB or RBG index and offset for frequency resource allocation).<br>Typically, 10 < $n_{HARQ}$ < 16 |
| MCS and RV | 5 | MCS and RV for retransmission. |
| Timing Advance | $n_{TA}$ | The $n_{TA}$ is for Time Advance feedback.<br>Typically, $n_{TA}$ is around 6 bits. |
| TPC | $n_{TPC}$ | The $n_{TPC}$ is for closed loop transmit power control feedback.<br>Typically, $n_{TPC}$ is around 1~2 bits. |

TABLE 10B

Example of a DCI Format 0D for Grant-free Resource Activation and Deactivation

|  | Activation | Deactivation |
|---|---|---|
| TPC for PUSCH | set to '00' | set to '00' |
| Cyclic shift for DM RS | set to '000' if present | set to '000' if present |
| MCS and RV | MSB is set to '0' | set to '11111' |
| Resource block assignment and hopping resource allocation | N/A | Set to all '1's |

TABLE 10C

Example of a DCI Field for BFRR

| Bit field mapped to index | Message |
|---|---|
| 0 | new candidate beam reported in UE's latest BFRR will not be used. |
| 1 | new candidate beam reported in UE's latest BFRR will be used. |

TABLE 10D

Example of a DCI Field for BFRR

| Bit field mapped to index | Message |
|---|---|
| 00 | The $1^{st}$ new candidate beam reported in UE's latest BFRR will be used. |
| 01 | The $2^{nd}$ new candidate beam reported in UE's latest BFRR will be used. |
| 10 | The $3^{rd}$ new candidate beam reported in UE's latest BFRR will be used. |
| 11 | None of new candidate beams reported in UE's latest BFRR will not be used. |

TABLE 11

Example of a DCI Format 7A for Response to BFRR

| DCI Format 7A | Bits | Comment |
|---|---|---|
| DL TX beam confirmation | N | The number of new candidate beams in UE's BFRR ≤ $2^{N-1}$ |
| CSI-RS allocation in the DL | $\lceil \log_2^M \rceil$ + K1 + $N_{CSI-RS}$ | $\lceil \log_2^M \rceil$ indicates one out of the M CSI-RS configurations; K1 kits indicates $2^{K1}$ possible timing offsets; $N_{CSI-RS}$ indicates the number of CSI-RS repetitions. |
| Indication of PUCCH resources of the format used for beam reporting | $\lceil \log_2^Q \rceil$ + K2 | $\lceil \log_2^Q \rceil$ indicates one out of the Q PUCCH resources, and K2 bits indicates one of $2^{K2}$ PUCCH resources indices. |
| The timing offset of beam reporting | K3 or 0 bits (implicit) | Indicates one of $2^{K3}$ possible timing offsets of beam reporting |
| Number of beam reporting | 0 or K4 bits | For 0 bits, the number of beam reporting equals to a number specified in the standards, say 1. Otherwise, it indicates one of $2^{K4}$ possible numbers of beam reporting |
| UE ID | 16 | UE ID such as C-RNTI, SPS-CRNTI etc. |

TABLE 12

Example of a DCI Format 7B for UL TX Beam Change

| DCI Format 7B | Bits | Comment |
|---|---|---|
| UL TX beam change indication | 1 or 2 | Indication of new UL TX beam change or not, and known at the gNB or needs more measurement of SRS |
| ULnew TX beam | P | Indicates one of 2P UL TX beams (identified by corresponding UL SRS) |
| SRS transmission | $\lceil \log_2^R \rceil$ + K5 | $\lceil \log_2^R \rceil$ indicates one out of the M SRS configurations. K5 indicates $2^{K5}$ possible timing offsets. |
| Number of SRS transmission | 0 or K6 bits | For 0 bits, the number of SRS on a given UL TX beam equals to a number specified in the standards, say 1. Otherwise, it indicates one of $2^{K6}$ possible numbers of SRS transmission. |
| UE ID | 16 | UE ID such as C-RNTI, SPS-CRNTI etc. |

TABLE 13

Number of bits and description for DCI fields

| DCI field name | Bits | Description |
|---|---|---|
| PDSCH Quasi-Co-Location Indicator | 1 or 2 or 3 | Each state corresponding to a set of RS(s) that is QCL-ed with DMRS for PDSCH |
| PDCCH Quasi-Co-Location Indicator | 1 or 2 or 3 | Each state corresponding to a set of RS(s) that is QCL-ed with DMRS for PDCCH |
| Quasi-Co-Location checking Indicator | 1 | Flag for QCL checking occasion |
| Aperiodic CSI-RS triggering indicator | 1 | Flag for Aperiodic CSI-RS triggering |
| Aperiodic CSI-RS resource indicator | 2 | Each state corresponding to an Aperiodic CSI-RS resources for Aperiodic CSI-RS transmission |
| Aperiodic interference measurement resource (IMR) triggering indicator | 1 | Flag for Aperiodic interference measurement resource (IMR) triggering |

TABLE 14

PDSCH Quasi-Co-Location Indicator field in DCI using 1 bit

| Value of 'PDSCH Quasi-Co-Location Indicator' field | Description |
|---|---|
| '0' | Parameter set 1 configured by higher layers |
| '1' | Parameter set 2 configured by higher layers |

TABLE 15

PDSCH Quasi-Co-Location Indicator field in DCI using 2 bits

| Value of 'PDSCH Quasi-Co-Location Indicator' field | Description |
|---|---|
| '00' | Parameter set 1 configured by higher layers |
| '01' | Parameter set 2 configured by higher layers |
| '10' | Parameter set 3 configured by higher layers |
| '11' | Parameter set 4 configured by higher layers |

TABLE 16

PDSCH Quasi-Co-Location Indicator field in DCI using 3 bits

| Value of 'PDSCH Quasi-Co-Location Indicator' field | Description |
|---|---|
| '000' | Parameter set 1 configured by higher layers |
| '001' | Parameter set 2 configured by higher layers |
| '010' | Parameter set 3 configured by higher layers |
| '011' | Parameter set 4 configured by higher layers |
| '100' | Parameter set 5 configured by higher layers |
| '101' | Parameter set 6 configured by higher layers |
| '110' | Parameter set 7 configured by higher layers |
| '111' | Parameter set 8 configured by higher layers |

TABLE 17

PDCCH Quasi-Co-Location Indicator field in DCI using 1 bit

| Value of 'PDCCH Quasi-Co-Location Indicator' field | Description |
|---|---|
| '0' | Parameter set 1 configured by higher layers |
| '1' | Parameter set 2 configured by higher layers |

TABLE 18

PDCCH Quasi-Co-Location Indicator field in DCI using 2 bits

| Value of 'PDCCH Quasi-Co-Location Indicator' field | Description |
|---|---|
| '00' | Parameter set 1 configured by higher layers |
| '01' | Parameter set 2 configured by higher layers |
| '10' | Parameter set 3 configured by higher layers |
| '11' | Parameter set 4 configured by higher layers |

TABLE 19

PDCCH Quasi-Co-Location Indicator field in DCI using 3 bits

| Value of 'PDCCH Quasi-Co-Location Indicator' field | Description |
|---|---|
| '000' | Parameter set 1 configured by higher layers |
| '001' | Parameter set 2 configured by higher layers |
| '010' | Parameter set 3 configured by higher layers |
| '011' | Parameter set 4 configured by higher layers |
| '100' | Parameter set 5 configured by higher layers |
| '101' | Parameter set 6 configured by higher layers |
| '110' | Parameter set 7 configured by higher layers |
| '111' | Parameter set 8 configured by higher layers |

TABLE 20

Quasi-Co-Location checking Indicator field in DCI

| Value of 'Quasi-Co-Location checking Indicator' field | Description |
|---|---|
| '0' | NO QCL checking is indicated |
| '1' | QCL checking is indicated with threshold set configured by higher layers |

TABLE 21

Aperiodic CSI-RS resource indicator field in DCI

| Value of 'Aperiodic CSI-RS resource indicator' field | Description |
|---|---|
| '00' | Aperiodic CSI-RS resources 1 configured by higher layers |
| '01' | Aperiodic CSI-RS resources 2 configured by higher layers |
| '10' | Aperiodic CSI-RS resources 3 configured by higher layers |
| '11' | Aperiodic CSI-RS resources 4 configured by higher layers |

TABLE 22

Number of bits and description for DCI fields

| DCI field name | Bits | Description |
|---|---|---|
| BWP activation | 1 | Activation of BWP: 0: disable 1: enable |
| Reference point | n bits | Starting (PRB) address |
| BWP bandwidth | m bits | active bandwidth (in PRBs) |
| PDSCH starting symbol | 4 bits | PDSCH starting symbol (in a slot) |

TABLE 23

PDSCH Quasi-Co-Location Indicator field in DCI using N bits

| Value of 'PDSCH and Quasi-Co-Location Indicator' field | Description |
|---|---|
| 00 . . . 0 | Parameter set 1 configured by RRC and/or MAC-CE |
| . . . | Parameter set n configured by RRC and/or MAC-CE |
| . . . | Parameter set n + 1 configured by RRC and/or MAC-CE |
| . . . | . |
| . . . | . |
| . . . | . |
| 11 . . . 1 | Parameter set N configured by RRC and/or MAC-CE |

What is claimed:

1. A User Equipment (UE) comprising a circuitry configured to:
monitor a first configuration for a first control indication, the first control indication pertaining to a first set of time and frequency resources for a first data transmission,
wherein the first set of time and frequency resources are allocated as a joint control resource set with a first control indication transmitted in a PDCCH;
monitor a second configuration for a plurality of second control indications, the second control indication pertaining to a second set of time and frequency resources for a second data transmission,
wherein each of the second set of time and frequency resources is allocated as a separate control resource set with each of the plurality of second control indications transmitted in separate PDCCH,
wherein each of the first control indication and the plurality of second control indications comprise at least one of (i) CBG transmission indication or CBG flush indication, (ii) a Slot Format Indication (SFI), and (iii) a pre-emption indication for the first set of time and frequency resources or the second set of time and frequency resources; and receive downlink data transmission in accordance with the first control indication or the plurality of second control indications.

2. The UE of claim 1, wherein the first data transmission and the second data transmission are multi-link transmissions comprising a multi-BWP, a multi-TRP, a multi-carrier, or a multi-RAT transmission.

3. The UE of claim 2, wherein at least one of the first data transmission and the second data transmission is a multi-BWP transmission, and at least one of the first control indication and the plurality of second control indications comprises a BWP indication.

4. The UE of claim 1, wherein at least one of the first control indication and the plurality of second control indications comprises a mini-slot in a UE specific searching space.

5. A method for a network system, the method comprising:

transmitting a first configuration for a first control indication pertaining to a first set of time and frequency resources for a first data transmission wherein the first set of time and frequency resources are allocated as a joint control resource set with a first control indication transmitted in a PDCCH;

transmitting a second configuration for a plurality of second control indications pertaining to a second set of time and frequency resources for a second data transmission for a second TRP in a second cell, wherein each of the second set of time and frequency resources is allocated as a separate control resource set with each of the plurality of second control indications transmitted in separate PDCCH, wherein each of the first control indication and the plurality of second control indications comprise at least one of (i) CBG transmission indication or CBG flush indication, (ii) a Slot Format Indication (SFI), and (iii) a pre-emption indication for the first set of time and frequency resources or the second set of time and frequency resources; and sending, to a User Equipment (UE), downlink data transmission in accordance with the first control indication or the plurality of second control indications.

6. The method of claim 5, wherein the first data transmission and the second data transmission are multi-link transmissions comprising a multi-BWP, multi-TRP, multi-carrier, or a multi-RAT transmission.

7. The method of claim 6, wherein at least one of the first data transmission and the second data transmission is a multi-BWP transmission, and at least one of the first control indication and the plurality of second control indications comprises a BWP indication.

8. The method of claim 5, wherein at least one of the first control indication and the plurality of the second control indications comprises a mini-slot in a UE specific searching space.

9. A network apparatus comprising a circuitry configured to:

transmit a configuration for a first control indication or a plurality of second control indications, the first control indication pertaining to a first set of time and frequency resources for a first data transmission, wherein the first set of time and frequency resources are allocated as a joint control resource set with a first control indication transmitted in a PDCCH, and the second control indication pertaining to a second set of time and frequency resources for a second data transmission, wherein each of the second set of time and frequency resources is allocated as a separate control resource set with each of the plurality of second control indications transmitted in separate PDCCH, wherein each of the first control indication and the plurality of second control indications comprise at least one of (i) CBG transmission indication or CBG flush indication, (ii) a Slot Format Indication (SFI), and (iii) a pre-emption indication for the first set of time and frequency resources or the second set of time and frequency resources; and receive downlink data transmission in accordance with the first control indication or the plurality of second control indications.

10. The network apparatus of claim 9, wherein the first data transmission and the second data transmission are multi-link transmissions comprising a multi-BWP, a multi-TRP, a multi-carrier, or a multi-RAT transmission.

11. The network apparatus of claim 10, wherein at least one of the first data transmission and the second data transmission is a multi-BWP transmission, and at least one of the first control indication and the plurality of second control indications comprises a BWP indication.

12. The network apparatus of claim 9, wherein at least one of the first control indication and the plurality of the second control indications comprises a mini-slot in a UE specific searching space.

* * * * *